US010038789B1

(12) United States Patent
McKenna et al.

(10) Patent No.: US 10,038,789 B1
(45) Date of Patent: Jul. 31, 2018

(54) CALL ROUTING METHODS AND SYSTEMS

(71) Applicant: UIPCO, LLC, San Antonio, TX (US)

(72) Inventors: Peter H. McKenna, San Antonio, TX (US); Darrius M. Jones, San Antonio, TX (US); Kory Michael Upton, Helotes, TX (US); Enrique Tamayo, San Antonio, TX (US); Allen J. Guidry, San Antonio, TX (US); Julio Estevez-Breton, Alamo Heights, TX (US)

(73) Assignee: UNITED SERVICES AUTOMOBILE ASSOCIATION (USAA), San Antonio, TX (US)

( * ) Notice: Subject to any disclaimer, the term of this patent is extended or adjusted under 35 U.S.C. 154(b) by 0 days.

(21) Appl. No.: 15/890,950

(22) Filed: Feb. 7, 2018

Related U.S. Application Data

(63) Continuation of application No. 15/260,513, filed on Sep. 9, 2016, now Pat. No. 9,917,951.

(60) Provisional application No. 62/216,024, filed on Sep. 9, 2015.

(51) Int. Cl.
*H04M 3/00* (2006.01)
*H04M 5/00* (2006.01)
*H04M 3/523* (2006.01)
*G06Q 30/02* (2012.01)
*H04M 3/436* (2006.01)
*H04M 3/42* (2006.01)

(52) U.S. Cl.
CPC ...... *H04M 3/5235* (2013.01); *G06Q 30/0202* (2013.01); *H04M 3/42068* (2013.01); *H04M 3/4365* (2013.01); *H04M 3/5238* (2013.01)

(58) Field of Classification Search
CPC ...... H04M 3/51; H04M 3/5183; H04M 3/523; H04M 3/5235; H04M 3/5232
USPC .... 379/266.08, 272, 265.11, 265.13, 265.01, 379/265.05, 243
See application file for complete search history.

(56) References Cited

U.S. PATENT DOCUMENTS 9,692,901 B2 * 6/2017 Ma ...................... H04M 3/5235

* cited by examiner

*Primary Examiner* — Thjuan K Addy
(74) *Attorney, Agent, or Firm* — Perkins Coie LLP

(57) ABSTRACT

Methods and systems for routing calls based on a minimum expected delay, classification, and priority of the call are provided. In some embodiments, when a call is received, the call is classified and prioritized within the classification. A minimum expected delay time is determined. Based on the minimum expected delay time, the classification, and the prioritization, the call is routed to a representative with instructions on how the call should be treated.

20 Claims, 17 Drawing Sheets

CALL ROUTING METHODS AND SYSTEMS

CROSS-REFERENCE TO RELATED APPLICATIONS

This application is a continuation of U.S. patent application Ser. No. 15/260,513, filed on Sep. 9, 2016, entitled "CALL ROUTING METHODS AND SYSTEMS," now allowed, which is a non-provisional of and claims priority to U.S. Provisional Application No. 62/216,024, filed on Sep. 9, 2015, entitled "CALL ROUTING METHODS AND SYSTEMS," which is hereby incorporated by reference in its entirety for all purposes.

BACKGROUND

Calls received into call centers typically deliver only one type of call treatment for the calls it receives. But, each caller's situation is different and ideally, each caller would receive different call treatment, particularly in large companies where many products or services are offered.

BRIEF DESCRIPTION OF THE DRAWINGS

Embodiments of the present disclosure will be described and explained through the use of the accompanying drawings in which.

DETAILED DESCRIPTION

Figure 1:
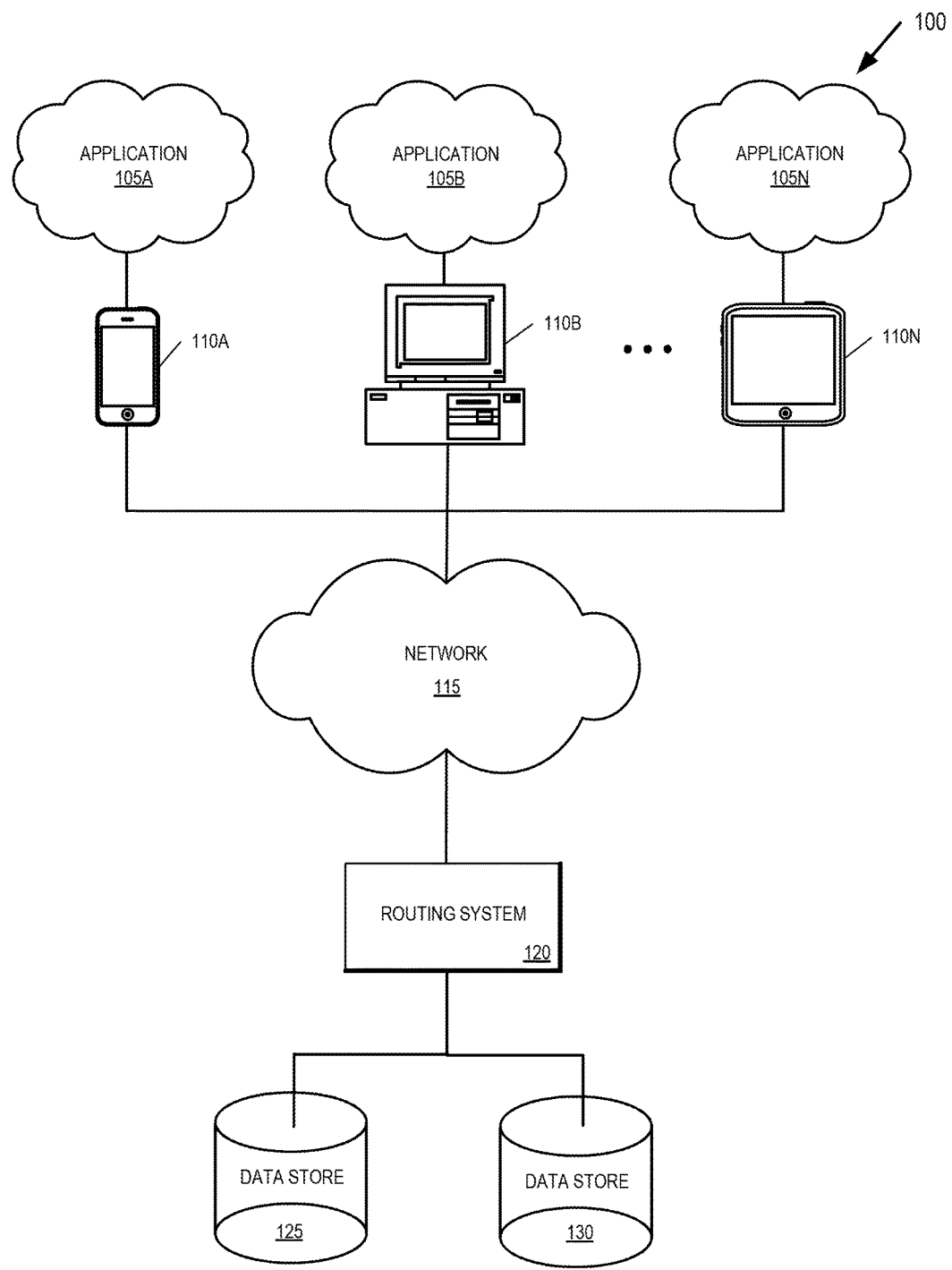
FIG. 1 illustrates an example of a network-based operating environment in accordance with various embodiments of the disclosure.

Various embodiments of the present disclosure generally relate to authentication. More specifically, various embodiments of the present disclosure relate to methods and systems for authenticating a user on a call.

Calls received into call centers typically deliver only one call treatment for the calls it services even though each caller's situation is different. Ideally, each caller would receive different call treatment. The individualized call treatment may be particularly important for members who are or who may be interested in acquiring new products. Companies have difficulty identifying which callers are or may be interested in the short amount of time from when the call is received to the time the call is transferred to a representative. Embodiments of the present disclosure describe a predictive model that uses customer data to determine a likelihood that the customer will accept an offer to discuss or learn about new products or services with a representative and can route the call accordingly.

The methods and systems described herein efficiently and strategically connect callers with a Master Service Representative ("MSR") (e.g., representative) according to a likelihood that the caller will accept an offer to speak with a representative about a new product or service during the call. A "new" product can include products which the caller does not have or upgrades to a product the caller already has. In some embodiments, when a call is received, the system determines an identity of the caller. When a score indicating a likelihood that the user will accept an offer to speak with a representative regarding a new product or service on the call can be generated (e.g., if the caller has been a customer for over a period of time), the system generates the score based on factors such as recent purchases (e.g., new home), recent life events (e.g., new baby, divorce), frequency and nature of calls, employment status, financial strength, context of recent calls, and prior digital behavior (e.g., websites visited, activity on a mobile application).

When the score is higher than a deepening relationship threshold, the call is classified as an "Enhanced Deepening" ("ED") call and the routing infrastructure then routes the call to an ED MSR. An ED MSR is an MSR who is equipped to handle calls from members who may be acquiring new products. Calls classified as ED calls are treated differently from other calls because the ED MSRs have a specific protocol that enables the ED MSRs to focus on selling new or upgraded services or products that the caller may need or want. Thus, ED calls can be considered potential opportunities for referral or deepening the member relationship with the company in addition to any other customer service that the ED MSR provides. The calls that are classified as ED calls can be prioritized as a high, medium, or low priority call, and positioned in the wait queue.

Calls that are scored but do not meet or exceed the threshold are classified as "Expedited Servicing" ("ES") calls and are routed to ES MSRs. ES treatment is standard customer service for customer calls. ES treatment differs from ED treatment in that ES treatment does not include selling new products to callers unless specifically asked and focuses on the customer service. The ES calls can be prioritized (e.g., ES High, ES Medium, and ES Low) according to the score. The calls will be answered by an ES MSR in an order of call arrival.

Priority level of both the ES and the ED calls determines whether the call will be delivered as intended (e.g., as an ES or ED call) or load balanced between ES and ED representatives. Generally, the priority level does not dictate the order in which the calls are answered and the calls are answered in the order they are received. However, in some embodiments, the priority level can be used to dictate the order in which the calls are answered.

When the score cannot be generated (e.g., the caller is a new customer or has not been a customer for a requisite time period, there is a model outage, caller identity is unknown), the call can be routed according to business rules. For example, the caller has been a customer for a certain period of time (e.g., 6 months to a year), then the caller may be considered likely to accept an offer to speak with a representative about a new product or service and thus the call is classified as ED and prioritized as a high priority. If the caller's identity is not known (e.g., the caller's phone is not registered or the caller cannot remember or provide a member number), the call may be classified as ES and prioritized as a medium priority. The classifications and priorities can change with various business rules.

Depending upon an expected wait time, the classified and prioritized calls are routed to an MSR. When the expected wait time is below a time limit, the calls are routed as classified (e.g., ED, ES), answered in order of call arrival, and treated according to the classification. However, when the expected wait time is over a certain time limit, the call may be routed to the first available ES or ED MSR and given ES treatment to relieve the wait time.

This disclosure describes efficient authentication processes designed to reduce inefficiencies in the call routing process. Various embodiments may provide one or more of the following technological improvements: 1) improved call routing techniques and systems within a call system by classifying and prioritizing calls; 2) improved processing of calls by efficiently determining whether a call can be scored, and either scoring the call or applying business rules; 3) improved user experience by prioritizing calls and routing calls to ED specialists when appropriate; and 4) more efficient routing of calls based on both interest and wait time.

In the following description, for the purposes of explanation, numerous specific details are set forth in order to provide a thorough understanding of embodiments of the present disclosure. It will be apparent on reading the disclosure, however, to one skilled in the art that embodiments may be practiced without some of these specific details. For example, although classifying, prioritizing, and routing calls is discussed, the disclosure is not limited to voice calls or calls generally. For example, techniques disclosed herein could be used to route chat requests, video calls, calls from a website or from a mobile application (e.g., via VoIP).

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates an example of a network-based operating environment 100 in which some embodiments of the present disclosure may be used. As illustrated in FIG. 1, operating environment 100 may include applications 105A-105N running on one or more computing devices 110A-110N (such as a mobile device, a mobile phone, a telephone, a tablet computer, a mobile media device, a mobile gaming device, a vehicle-based computer, a dedicated terminal, a public terminal, desktop or laptop computer, a kiosk, wearable devices such as a smartwatch, etc.). In some embodiments, applications 105A-105N may be stored on one or more of computing devices 110A-110N or may be stored remotely on a server (in the "cloud"). These computing devices can include mechanisms for receiving and sending traffic by connecting through network 115 to routing system 120 and data stores 125 and 130.

Computing devices 110A-110N may be configured to communicate via the network 115 with routing system 120. In some embodiments, computing devices 110A-110N can retrieve or submit information to routing system 120 and run one or more applications with customized content retrieved by routing system 120 and data stores 125 and 130. For example, computing devices 110A-110N can execute a browser application or a customized client to enable interaction between the computing devices 110A-110N, routing system 120, and data stores 125 and 130.

Network 115 can be any combination of local area and/or wide area networks, using wired and/or wireless communication systems. Network 115 can be or could use any or more protocols/technologies: Ethernet, IEEE 802.11 or Wi-Fi, worldwide interoperability for microwave access (Wi-MAX), cellular telecommunication (e.g., 3G, 4G, 5G), CDMA, cable, digital subscriber line (DSL), etc. Similarly, the networking protocols used on network 115 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over network 115 may be represented using technologies, languages and/or formats including hypertext markup language (HTML) or extensible markup language (XML). In addition, all or some links can be encrypted using conventional encryption technologies such as secure sockets layer (SSL), transport layer security (TLS), and Internet Protocol security (IPsec).

Routing system 120 can be running on one or more servers and can be used to create user profiles, identify callers, generate scores, determine tenure, check call history, route calls, or to perform other activities. Routing system 120 may be communicably coupled with data stores 125 and 130 and computing devices 110A-110N and may communicate, access or receive data (e.g., identification information, tenure, scores, routes, thresholds, call wait time, call volume, etc.) from computing devices 110A-110N and data stores 125 and 130. Routing system 120 may be associated with a membership organization, and the callers may be members or potential members of the membership organization. The organization may be a financial institution and/or an insurance company.

Routing system 120 may be customized or calibrated by individual companies or service providers based on user needs and/or business objectives. For example, companies may have different business rules, different criteria for determining thresholds or different routing procedures.

In some cases, routing system 120 may receive calls, identify the caller, and communicate with data stores 125 and 130 to determine whether a score indicating a likelihood that the user will accept an offer to speak with a representative (either the one on the current phone line or a second representative) about a new product or service is available. In some implementations, the score indicates a likelihood the user will accept an offer to purchase a particular product. When a score is not available, business rules may determine how the call will be classified and prioritized. Routing system 120 may score the call, generate a deepening relationship threshold based on the call volume, and compare the call to the deepening relationship threshold. Based on the comparison, routing system 120 may classify, prioritize, and route the call. In some embodiments, routing system 120 includes various data processing and analytic tools that allow for the monitoring and evaluation of callers and user information retrieved from data stores 125 and 130.

Data stores 125 and 130 can be used to manage storage and access to user data such as call history (e.g., trends in calls, period of time between calls, purpose of calls), registered user devices, user identifications, user identifiers, member identification numbers, voice profiles, financial information, authentication history, user preferences, device fingerprints, personal identification numbers, tenure as a customer or member, recent activity with the entity (e.g., reviewing accounts on mobile application), current products and services purchased from the entity, previous purchases from the entity, and other information. Data stores 125 and 130 may be a data repository of a set of integrated objects that are modeled using classes defined in database schemas. Data stores 125 and 130 may further include flat files that can store data. Routing system 120 and/or other servers may collect and/or access data from the data stores 125 and 130.

Figure 2:
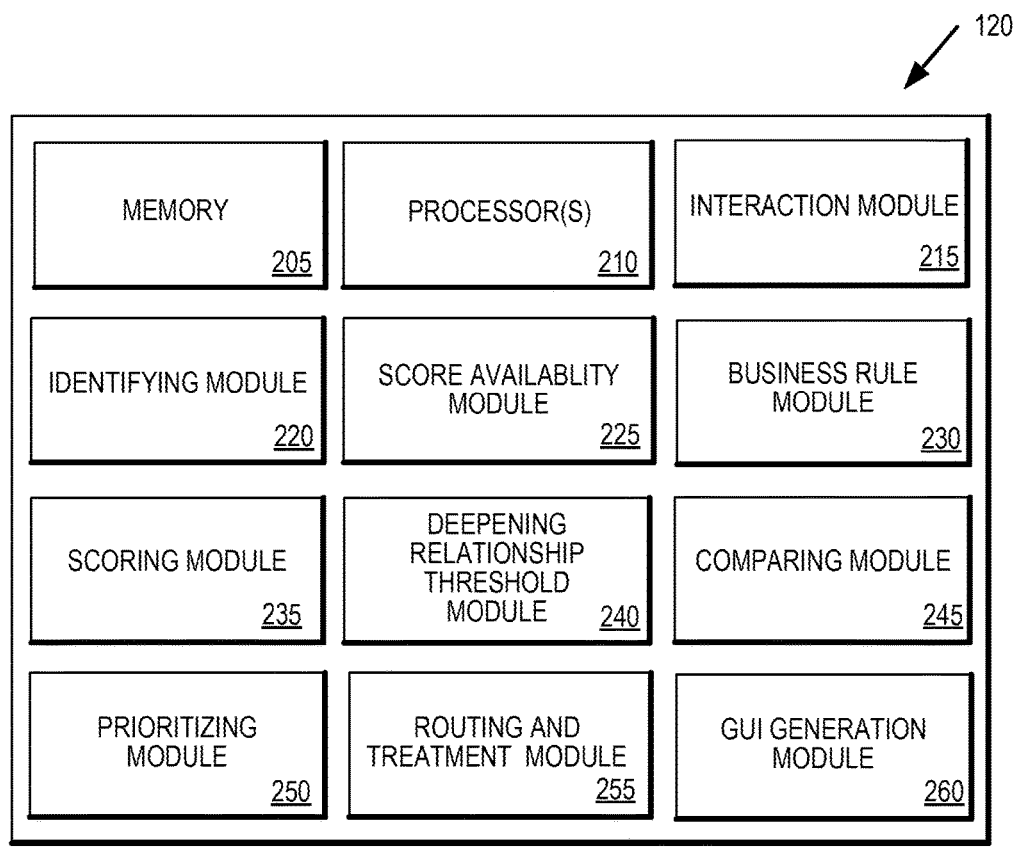
FIG. 2 is a block diagram illustrating components that can be included in a call system in accordance with various embodiments of the disclosure.

FIG. 2 is a block diagram illustrating components that can be included in a call system such as routing system 120. According to the embodiments shown in FIG. 2, routing system 120 may include memory 205, processor(s) 210, interaction module 215, identifying module 220, score availability module 225, business rule module 230, scoring module 235, deepening relationship threshold module 240, comparing module 245, prioritizing module 250, routing and treatment module 255, and graphic user interface (GUI) generation module 260. Other embodiments of the present disclosure may include some, all, or none of these modules and components along with other modules, applications, and/or components. The modules illustrated in FIG. 2 may be hardware, firmware, software, or a combination thereof. Some embodiments may incorporate two or more of these modules into a single module and/or associate a portion of the functionality of one or more of these modules with a different module.

Memory 205 can be any device, mechanism, or populated data structure used for storing information. In accordance with some embodiments of the present disclosure, memory 205 can encompass any type of, but is not limited to, volatile memory, nonvolatile memory, and dynamic memory. For example, memory 205 can be random access memory, memory storage devices, optical memory devices, magnetic media, floppy disks, magnetic tapes, hard drives, SIMMs, SDRAM, DIMMs, RDRAM, DDR RAM, SODIMMS, erasable programmable read-only memories (EPROMs), electrically erasable programmable read-only memories (EEPROMs), compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information which can be used as memory 205.

Memory 205 may be used to store instructions for running one or more applications or modules on processor(s) 210. For example, memory 205 could be used in one or more embodiments to house all or some of the instructions needed to execute the functionality interaction module 215, identifying module 220, score availability module 225, business rule module 230, scoring module 235, deepening relationship threshold module 240, comparing module 245, prioritizing module 250, routing and treatment module 255, and GUI generation module 260.

Interaction module 215 may be capable of receiving an interaction such as a call from a user over a communications network. The call may be made via a mobile device, wearable device, landline telephone, laptop, desktop, or other device capable of interacting with an entity. When the call is received, interaction module 215 may collect or receive identifying information such as a device identifier or a unique identifier such as a phone number, device fingerprint, and/or voice biometric. Interaction module 215 may further collect information regarding the user such as prior digital activity (e.g., internet searches the user has made on the calling device or other registered devices, mobile application activity, websites visited).

Identifying module 220 may be capable of identifying the caller based on the device identifier of the calling device, a voice biometric, and/or the caller providing identifying information (e.g., name, member number, etc.). If the caller cannot be identified using passive methods (e.g., device information collection, voice biometrics) the caller may be asked to identify himself or herself (e.g., name, member number, etc.), and, in some embodiments, provide verification (e.g., social security number, birthday, etc.). Identifying module 220 communicates the identity of the caller, if known, to score availability module 225.

Score availability module 225 determines whether a score that the user will accept an offer to speak with a representative about a new product or service can be generated. The score may not generated when the caller's identity (e.g., member identification number) is unknown, when the caller has not been a customer or member for greater than a minimum period of time (i.e., tenure of customer or member), when the call is transferred from a different business unit, division, or third party, or when scoring module 235 is experiencing an outage.

When score availability module 225 determines that a score cannot be generated, business rule module 230 determines a classification and priority for the call through a series of rules. Business rule module 230 first determines whether the caller has been identified. When the caller has not been identified, business rule module 230 classifies the call as an ES call and prioritizes the call as a medium priority. As mentioned above, the business rules may be configured differently. For example, when a caller has not been identified, the call is prioritized as a low priority.

On the other hand, when the caller has been identified, the classification may be based on the caller's tenure with the entity. For example, if the caller has been a customer for less than a period of time (e.g., less than six months), then the call may be classified as ED and given a high priority because this caller likely may need or want to purchase new products or services. If the caller has been a customer or member for more than a period of time, but less than a second period of time (e.g., greater than or equal to six months but less than a year), then the call may be classified as ED and prioritized with a medium priority. If the caller has been a customer or member for greater than the second period of time (e.g., greater than or equal to a year), then the call may be classified as ES and prioritized with a medium priority.

When score availability module 230 determines that a score can be generated, scoring module 235 generates a score indicating a probability that the customer will accept an offer to speak with a representative about a new product or service during the call. In some implementations, the score indicates a probability that the user will accept an offer to purchase a new product or service. The score may be generated based on factors such as prior digital activity (e.g., websites visited, mobile application pages visited, internet searches), recent purchases (e.g., new home), recent life events (e.g., new baby, divorce), frequency and nature of calls, employment status, context of call from other channels (e.g., recent calls, recent investments), information about products owned, and information indicating the financial stability level of the member. The score is communicated to comparing module 245 to determine whether the score meets or exceeds the deepening relationship threshold.

Deepening relationship threshold module 240 sets a threshold over which the score must exceed for the call to be classified as an ED call. The threshold may be set by the business based on contact center capacity and/or corporate product and relationship goals. In some embodiments, the threshold is set at the point in the scoring range above which it is economically viable to deepen (e.g. the income or profit taking index generated by products acquired is greater than the value of the incremental average handle time investment). In other embodiments, the threshold is set based on call volume in order to help facilitate faster implementation of call routing with minimal workforce impact. The threshold may change periodically (e.g., seasonally, monthly, daily, hourly), per business unit, or per shift change.

Comparing module 245 compares the score from scoring module 235 with the threshold from deepening relationship threshold module 240 and determines whether the score meets or exceeds the threshold. When the score meets or exceeds the threshold, the call is classified as an ED call. When the score does not meet or exceed the threshold, then the call is classified as an ES call.

Prioritizing module 250 can prioritize the calls that are scored after the scores are compared to the deepening relationship threshold. In some embodiments, the calls that exceed the threshold (ED calls) are prioritized based on their scores. For example, if a call meets or exceeds an ED high priority threshold, then the call is considered an ED high priority call. If the score is between the deepening relationship threshold and an ED low priority threshold, the call may be prioritized as an ED low priority. If the score is above the ED low priority threshold but below the ED high priority threshold, then the call may be prioritized as an ED medium priority.

Likewise, prioritizing module 250 may prioritize the calls that do not exceed the deepening relationship threshold based on their score. The calls may be categorized as ES low, ES medium, and ES high. The calls categorized as low priority are the ES calls most likely to generate deepening opportunities relative to other ES calls. Therefore, it is less of a priority that the low priority ES calls get routed to the intended ES treatment. The calls categorized as high priority ES calls are least likely to yield deepening opportunities and thus it is a higher priority for these calls to be routed to the intended treatment.

If the score meets or exceeds an ES low priority threshold, then the call may be considered an ES low priority call. When the score is below the ES low priority threshold but above an ES high priority threshold, the call may be considered an ES medium priority. If the score is below the ES high priority threshold, the call can be considered an ES high priority.

After the calls are classified and prioritized, routing and treatment module 255 routes the calls to ED MSRs or ES MSRs. Routing and treatment module 255 may load balance the calls such that the calls are routed to an ED MSR or an ES MSR based on a minimum expected delay for the call to be answered by a representative and the calls are given different treatment by the MSR depending on the expected delay. Different treatment types may include ES treatment and ED treatment. ES treatment refers to standard customer service treatment in which the MSR assists the caller with the question or issue the caller is calling about but does not offer additional services or products unless specifically asked. ED treatment provides the same standard customer service treatment as ES treatment but goes a step further by proactively attempting to uncover needs and extending offers for the purchase of additional products to the caller.

Table 1 shows an example of the minimum expected delay (MED) time and the respective routing and treatment. Assuming there are no significant time delays, the calls are answered according to their respective priorities. However, when the MED is expected to be above a certain level, certain calls may be routed to the first available ES or ED MSR regardless of the call's classification and given ES treatment so that the callers are not waiting for more than a certain amount of time.

TABLE 1

| Expedited Servicing Contact Center | Minimum Expected Delay (MED) in seconds | Routing of Expedited Servicing (ES) Calls | Treatment |
| --- | --- | --- | --- |
| Normal | MED ≤ 10 | Route Low, Medium & High Priority ES Calls to ES MSRs | Expedited Servicing for Low, Medium & High Priority ES Calls |
| Elevated | 10 < MED ≤ 40 | Route Medium & High Priority ES Calls to ES MSRs Route Low Priority ES Calls to | Expedited Servicing for Low, Medium & High Priority ES Calls |

TABLE 1-continued

| | | | |
|---|---|---|---|
| Severe | 40 < MED ≤ 90 | First Available ES or ED MSRs Route High Priority ES Calls to ES MSRs Route Low & Medium Priority ES Calls to First Available ES or ED MSRs | Expedited Servicing for Low, Medium & High Priority ES Calls |
| Critical | MED > 90 | Route Low, Medium & High Priority ES Calls to First Available ES or ED MSRs | Expedited Servicing for Low, Medium & High Priority ES Calls |

| Enhanced Deepening Contact Center | Minimum Expected Delay (MED) in seconds | Routing of Enhanced Deepening (ED) & Sales Calls | Treatment |
|---|---|---|---|
| Normal | MED < 10 | Route Low, Medium & High Priority ED Calls to ED MSRs Route Sales Calls to ED MSRs in front of ED calls | Enhanced Deepening for Low, Medium & High Priority ED Call Enhanced Deepening for Sales Calls |
| Elevated | 10 < MED ≤ 40 | Route Medium & High Priority ED Calls to ED MSRs Route Low Priority ED Calls to First Available ES or ED MSRs Route Sales Calls to ED MSRs in front of ED calls | Enhanced Deepening for Medium & High Priority ED Calls Expedited Servicing for Low Priority ED Calls Enhanced Deepening for Sales Calls |
| Severe | 40 < MED ≤ 90 | Route High Priority ED Calls to ED MSRs Route Low & Medium Priority ED Calls to First Available ES or ED MSRs Route Sales Calls to ED MSRs in front of ED calls | Enhanced Deepening for High Priority ED Calls Expedited Servicing for Low & Medium Priority ED Calls Enhanced Deepening for Sales Calls |
| Critical | MED > 90 | Route Low, Medium & High Priority ED Calls to First Available ES or ED MSRs Route Sales Calls to ED MSRs in front of ED calls | Expedited Servicing for Low, Medium & High Priority ED Calls Enhanced Deepening for Sales Calls |

For example, when the minimum expected delay is less than 10 seconds for an ES low, medium or high call, the call will be routed to the first available ES MSR in the order that the call was received. However, when the minimum expected delay is greater than 90 seconds for an ES call, the low, medium, and high priority ES calls are routed to the first available ES or ED MSR and treated with ES treatment without regard to their classification or priority. In another example, when the minimum expected delay for an ED call is greater than 10 seconds but less than or equal to 40 seconds, the ED medium and high priority calls are routed to the ED MSRs for ED treatment; ED low priority calls are routed to the first available ES or ED MSR for ES treatment. Sales calls are routed to the first available ED MSRs.

In some embodiments, certain calls such as a call that is strictly a sales call is not scored will be answered by the first available ED MSR and will be given ED treatment. In alternative embodiments, the deepening relationship threshold changes according to call volume. That is, the threshold rises when call volume is higher, and, therefore, the caller's score must be higher to qualify as ED. GUI generation module 260 is capable of generating one or more GUI screens that allow for interaction with a user. In at least one embodiment, GUI generation module 260 generates a graphical user interface receiving and/or conveying information to the user. For example, GUI generation module 260 may display a classification of the call. In some embodiments, the MSRs are alerted to the fact that the call is an ES call and are also provided information regarding the context of the call.

FIGS. 3-16 are flowcharts illustrating sets of operations for routing calls as described herein. In some embodiments, fewer than all of the operations in each setoff operations are performed, whereas in other embodiments additional operations are performed. Moreover, in some embodiments, the operations may be performed in different orders or in parallel. The operations can be performed by routing system 120 and/or various components of routing system 120 illustrated in FIG. 2.

Figure 3:
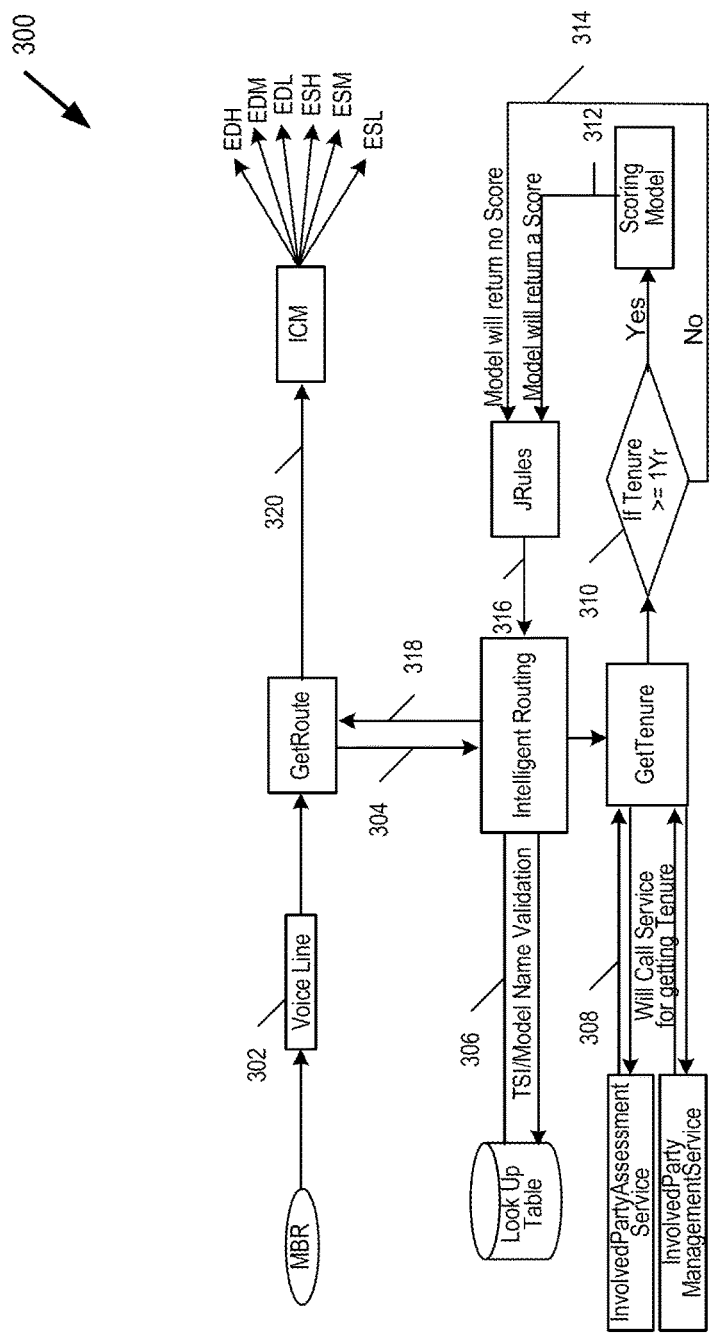
FIG. 3 is a flowchart illustrating a set of operations for routing a call in accordance with various embodiments of the disclosure.

FIG. 3 is a flowchart illustrating a set of operations 300 for routing a call as described herein. Receiving operation 302 receives a call from a member via a communications network and identifies information about the caller such as Transfer Service Index ("TSI") and/or previous digital history (e.g., websites visited, internet searches, mobile application activity) which is used to categorize the call intent. In some implementations, the digital history must be within a certain period of time prior to the call to be used for categorization (e.g., within a week, day, hour). Operation 304 calls the Intelligent Routing Service which validates TSI and/or the previous digital history and the model name (e.g., scoring model) in a lookup table in validation operation 306. Thus, Intelligent Routing Service validates that there is a record in the table that matches the combination of TSI and/or previous digital history and a model, allowing for flexibility to accommodate numerous scoring models. After validation, the Intelligent Routing Service calls GetTenure to determine the member's tenure through an involved party assessment service or involved party management service in operation 308. Determining operation 310 determines whether the member's tenure meets or exceeds a minimum time period such as one year. When the member has tenure greater than or equal to the minimum time period, a scoring model determines a score for the call indicating how likely the caller is to purchase or upgrade a product or service on the phone call in scoring operation 312. The score is used to determine a classification (e.g., ED, ES) and a priority (e.g., low, medium, high) for the call.

Figure 4:
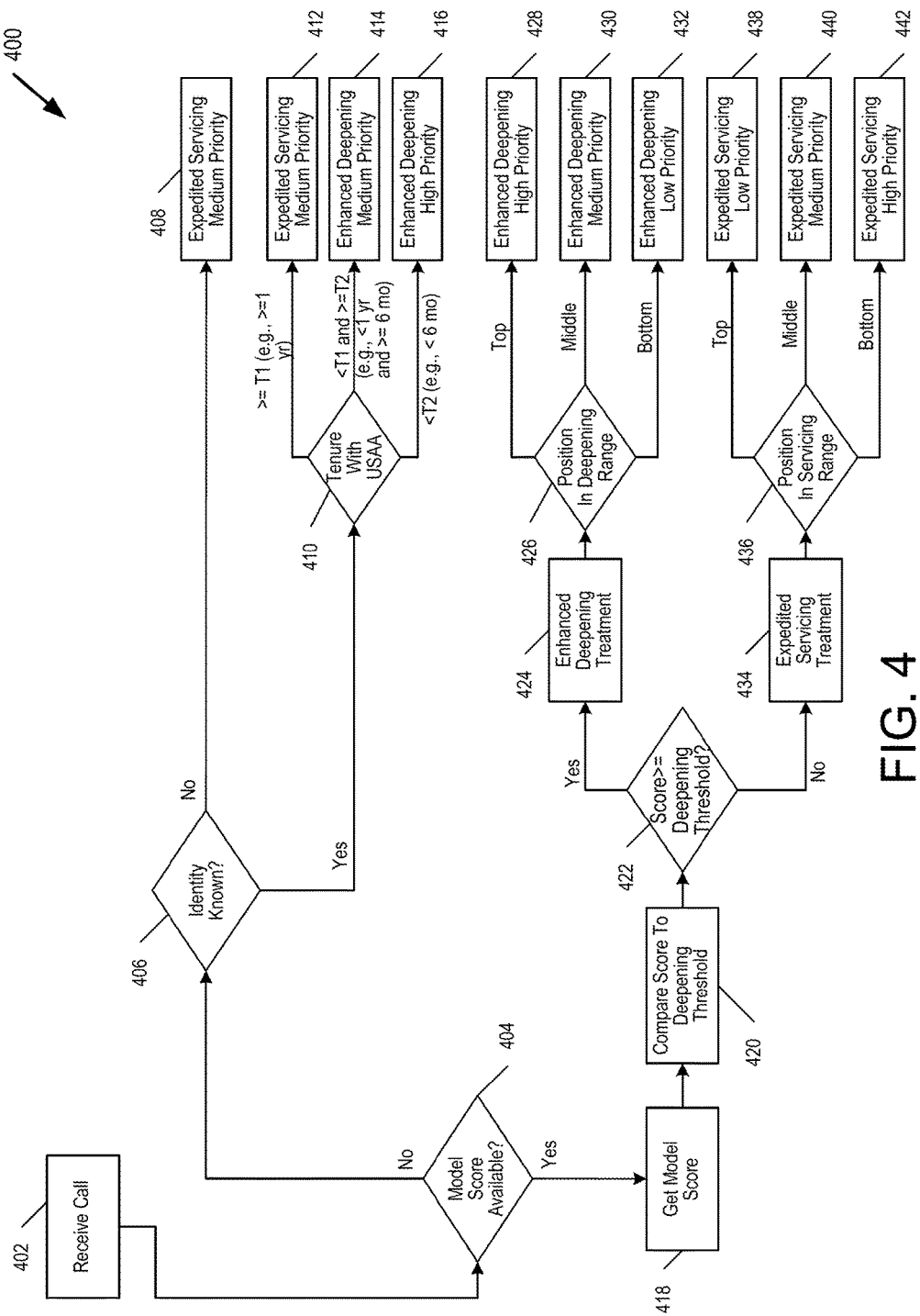
FIG. 4 is a flowchart illustrating a set of operations for routing a call in accordance with various embodiments of the disclosure.

When the member has tenure of less than the time period, the scoring model will not be called and the call will not be scored in operation 314 and instead JRules applies a business rule to classify and prioritize the call. JRules compares the scored calls to various thresholds to determine a classification and priority of the call (i.e., final routing decision) and sends the final routing decision to the Intelligent Routing Service in operation 316. In operation 318, the Intelligent Routing Service passes the final routing decision to GetRoute. In operation 320, GetRoute routes the final routing decision to a system such as Cisco's Intelligent Contact Management system where the call is load balanced and routed to an ES or ED MSR accordingly FIG. 4 is a flowchart illustrating a set of operations 400 for routing a call. Receiving operation 402 receives a call. Decision block 404 determines whether a model score is available for the call. Model scores may not be available under certain circumstances. For example, model scores may not be available if the model has an outage, if the caller's identity (e.g., member number) is unknown, or if the caller has not been a member or customer for more than a minimum period of time. When the model score is not available, decision block 404 branches to decision block 406 which determines whether the caller's identity is known. When the caller's identity is unknown, the call is automatically categorized as an ES medium priority call in operation 408. When the caller's identity is known, decision block 406 branches to decision block 410 where the caller's tenure with the organization is determined. When the caller has a tenure that is greater than or equal to a time period (e.g., a year), the call may be classified and prioritized as ES medium priority in operation 412. When the caller has been a customer for less than the time period but greater than or a second time period (e.g., six months), the call is classified and prioritized as ED medium priority in operation 414. When the caller has been a customer for less than the second time period (e.g., six months), the call is classified and prioritized as ED high priority in operation 416.

Referring back to decision block 404, when the score is available for the caller, decision block 404 branches to generating operation 418 where a score is generated for the call based on information such as prior history (e.g., recent inquiries, recent purchases), contextual information, information from other channels (e.g., searches on a website or on a mobile application). The score indicates the likelihood that the caller will make a purchase during the call. Comparing operation 420 compares the score to a deepening relationship threshold. Decision operation 422 determines whether the score is greater than or equal to a deepening relationship threshold. When the score is greater than or equal to the deepening relationship threshold, enhancing operation 424 classifies the call as an ED call eligible for ED treatment. Decision operation 426 determines a position or priority of the call. When the score is equal to or higher than a high priority threshold, the call is placed at the top of the ED calls with an ED high priority classification in operation 428. When the score is lower than the high priority threshold but above an ED low priority threshold, then the call is placed in the middle of the ED calls with an ED medium priority classification in operation 430. When the score is below an ED low priority threshold but at or above the deepening relationship threshold, then the call is placed at the bottom of the ED calls with an ED low priority classification in operation 432.

Referring back to decision block 422, when the score is below the deepening relationship threshold, expediting operation 434 classifies the call as an ES call. Decision operation 436 determines a position of the call in the servicing range. When the score is between the deepening relationship threshold and greater than an ES low priority threshold, the call is positioned at the top of the ES calls and classified as an ES low priority in operation 438. When the score is between the ES low priority threshold and an ES high priority threshold, the call is positioned in the middle of the ES calls and classified as an ES medium priority in operation 440. When the score is at or below the ES high priority threshold, the call is position at the bottom of the ES calls and is classified as an ES high priority in operation 442.

Figure 5:
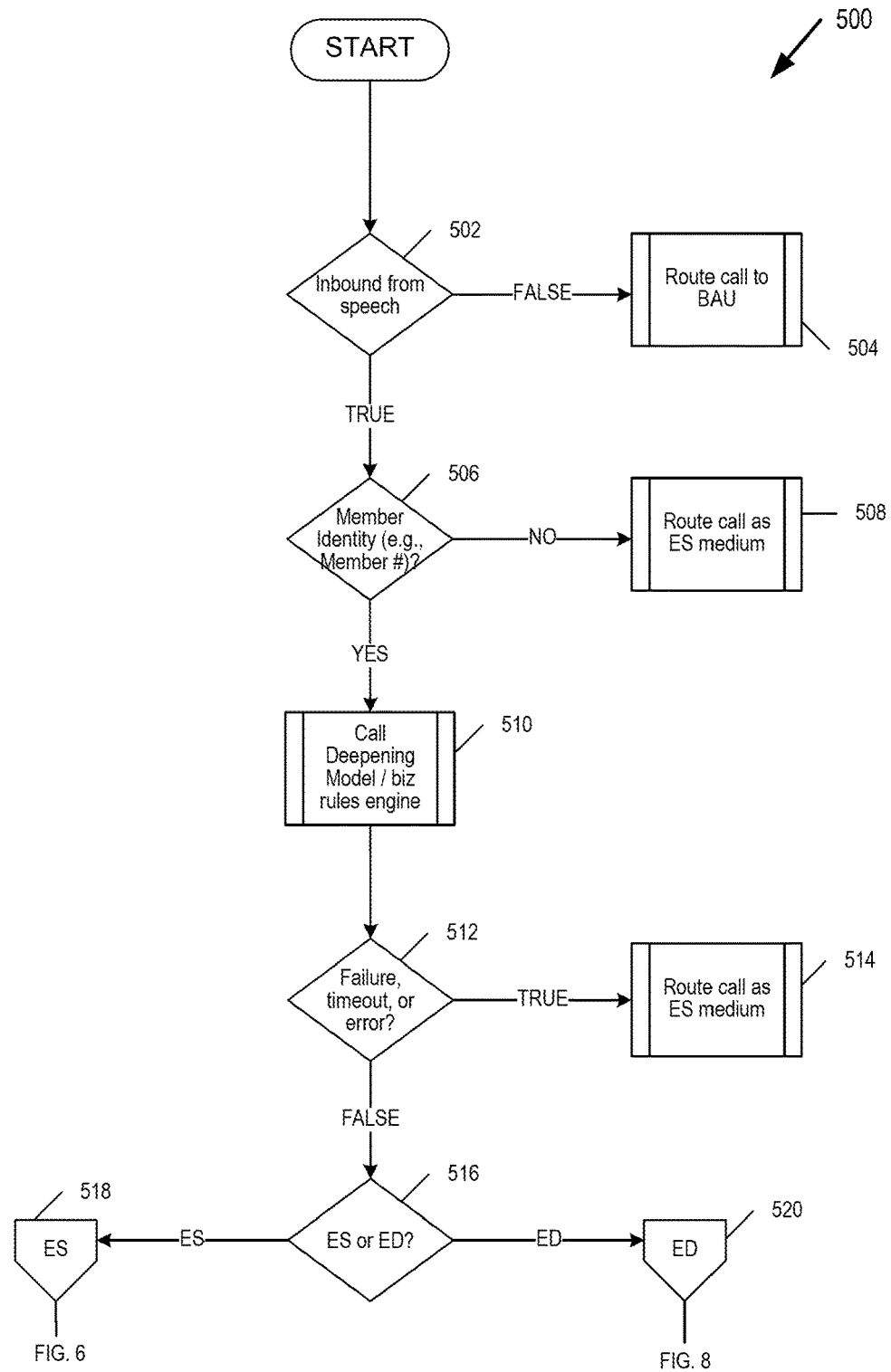
FIG. 5 is a flowchart illustrating a set of operations for routing a call in accordance with various embodiments of the disclosure.

FIG. 5 is a flowchart illustrating a set of operations 500 for routing an ES call. Decision operation 502 receives a call and determines whether the call is a non-speech call or a speech call. A speech call refers to inbound calls from the interactive voice response system. Non-speech calls refer to calls that are not received from the interactive voice response system such as representative to representative calls and direct toll-free number calls that bypass interactive voice response systems. Non-speech calls are routed according to Business as Usual, which indicates that no changes were made to call routing paths, in operation 504. When the call is a speech call, decision operation 506 determines whether the identity (e.g., member number) of the caller is known. In some embodiments, a specific piece of information identifying the member must be known such as a member number. When the identity of the caller is not known, decision operation 506 branches to operation 508, where the call is classified and prioritized as an ES medium call. When the identity of the caller is known, decision operation branches to operation 510, where the call deepening model or the business rules engine is applied. Decision block 512 determines whether there is a failure, timeout, or error. When there is a failure, timeout, or error, the call is routed as ES medium in operation 514. Where there is not a failure, timeout, or error, decision operation 516 classifies the call as an ES call in element 518 (continued in FIG. 6) or as an ED call in element 520 (continued in FIG. 8), depending on the results of the call deepening model or the business rules engine.

Figure 6:
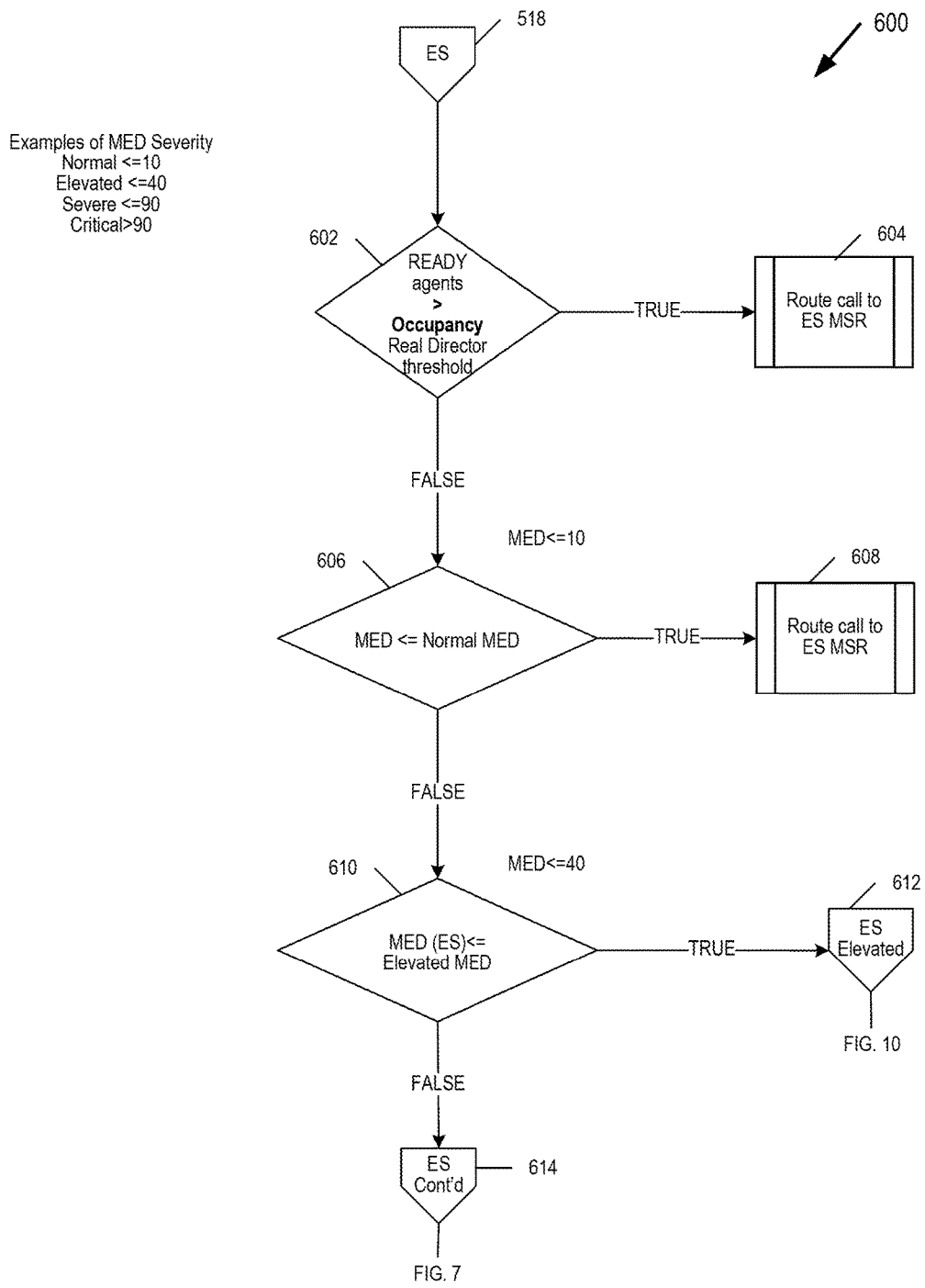
FIG. 6 is a flowchart illustrating a set of operations for routing a call in accordance with various embodiments of the disclosure.

FIG. 6 is a flowchart illustrating a set of operations 600 for routing a call. Continuing from element 518 from FIG. 5, the call is classified as an ES call. Decision operation 602 determines whether the number of ready agents exceeds the occupancy of the real director threshold. Real director is an application that allows variables to be externalized within the call routing application, allowing for user configurable values without an IT application change. When this is true, decision operation 602 branches to operation 604, where the call is routed to an ES MSR. When this is not true, decision operation 602 branches to decision operation 606 to determine whether the minimum expected delay is less than or equal to a normal MED (e.g., 10 seconds). When the MED is less than or equal to the normal value, the call is routed to an ES MSR in operation 608. When the MED is greater than the normal MED, decision operation 606 is routed to decision operation 610. Decision operation 610 determines whether the MED is equal to or less than an elevated MED (e.g., 40 seconds). When the MED is equal to or less than the elevated MED, decision operation 610 branches to element 612 (continued in FIG. 10). When the MED is greater than the elevated MED, decision operation 610 branches to element 614 (continued in FIG. 7).

Figure 7:
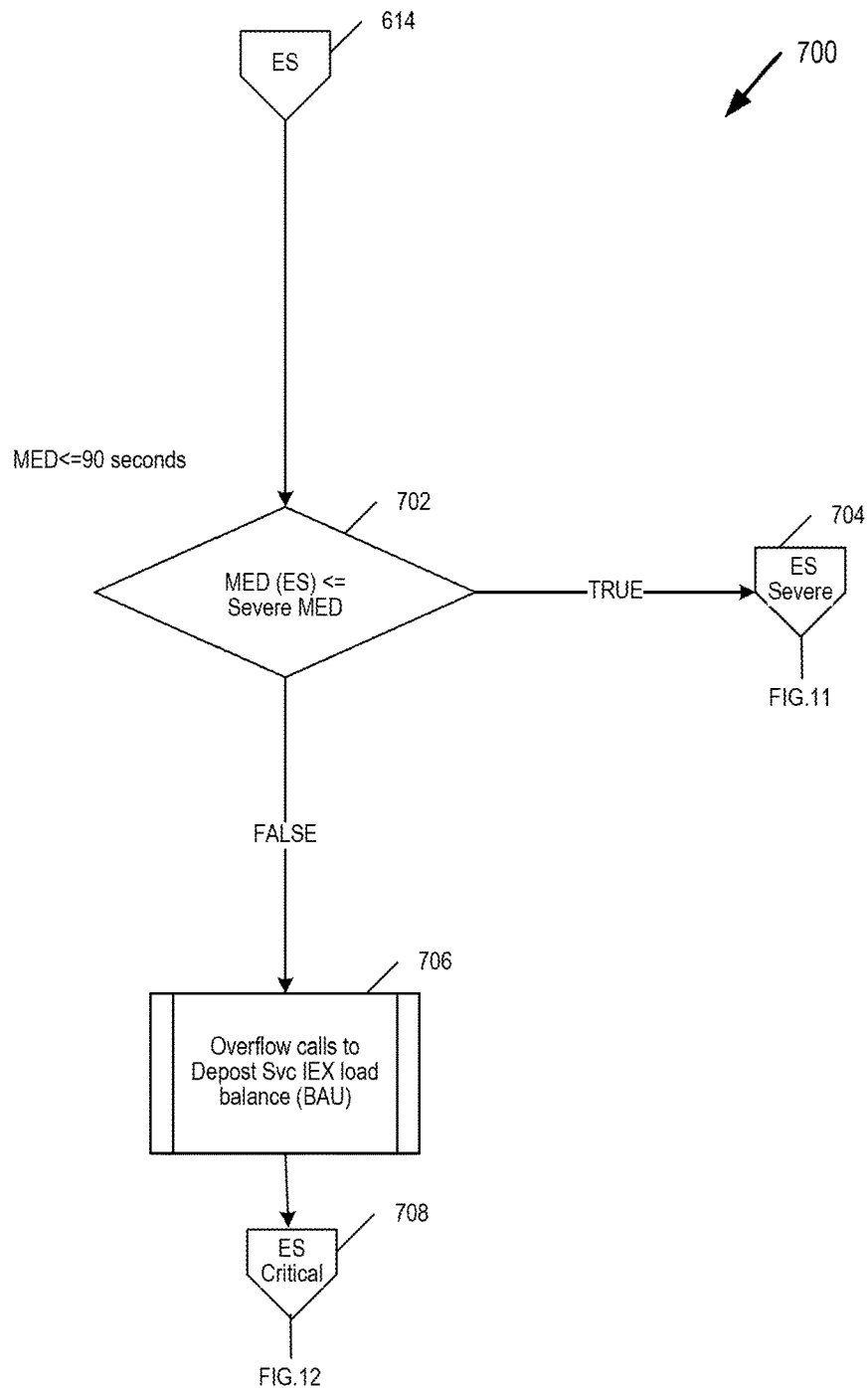
FIG. 7 is a flowchart illustrating a set of operations for routing a call in accordance with various embodiments of the disclosure.

FIG. 7 is a flowchart illustrating a set of operations 700 for routing an ES call. Continuing from element 614 in FIG. 6, decision operation 702 determines whether the MED is less than or equal to a severe MED (e.g., 90 seconds). If the MED is less than or equal to the severe MED, decision operation 702 branches to element 704 (continued in FIG. 11). If the MED is greater than the severe MED, decision operation 702 branches to operation 706 which routes overflow calls to be load balanced because the MED is critical, in element 708 (continued in FIG. 12).

Figure 8:
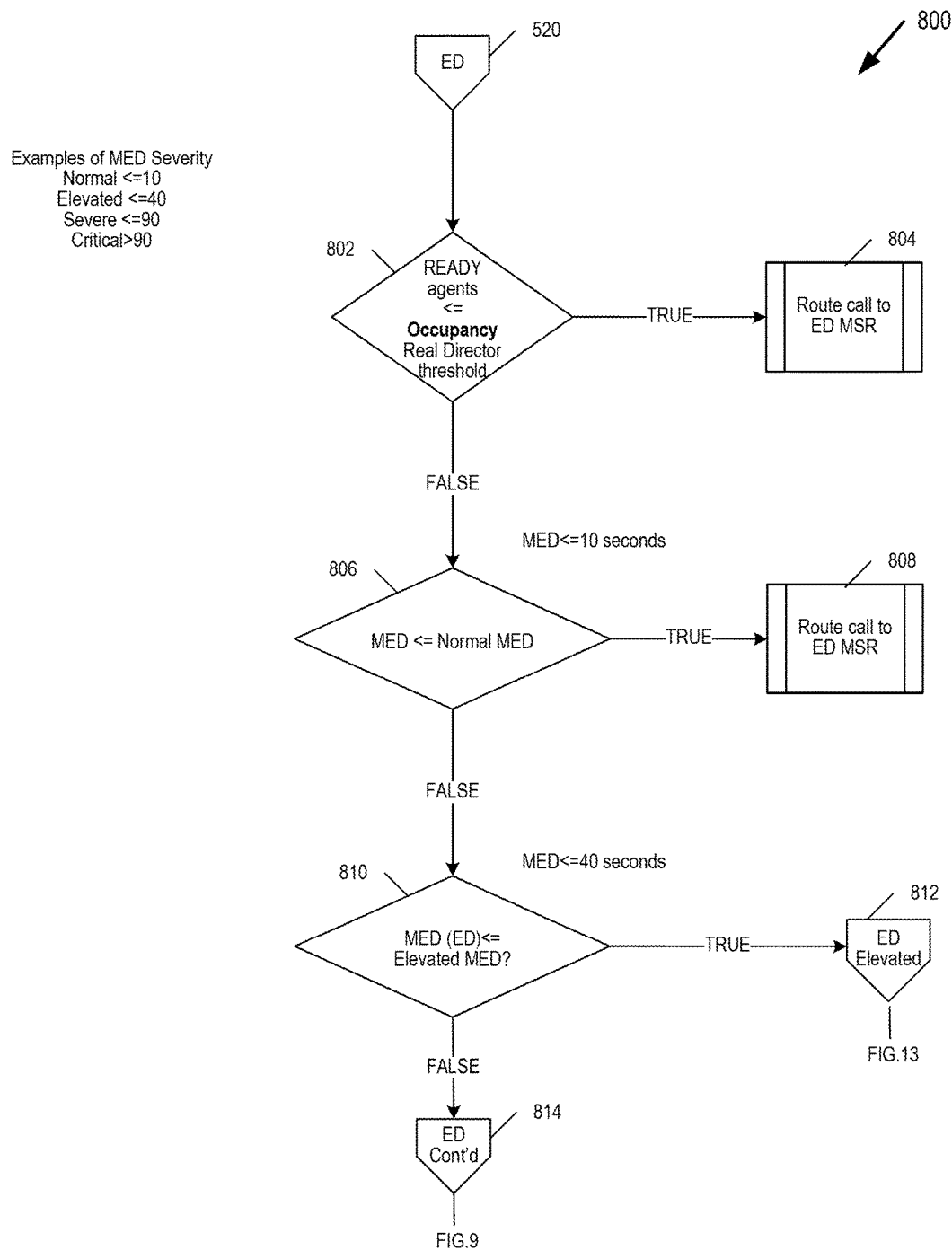
FIG. 8 is a flowchart illustrating a set of operations for routing a call in accordance with various embodiments of the disclosure.

FIG. 8 is a flowchart illustrating a set of operations 800 for routing an ED call. Continuing from element 520 in FIG. 5, decision operation 802 determines whether the number of ready agents is less than or equal to the occupancy of the real director threshold. Real director is an application that allows variables to be externalized within the call routing application, allowing for user configurable values without an IT application change. When this is true, decision operation 802 branches to operation 804, where the call is routed to an ED MSR. When this is not true, decision operation 802 branches to decision operation 806 to determine whether the minimum expected delay is less than or equal to a normal MED (e.g., 10 seconds). When the MED is less than or equal to the normal MED, the call is routed to an ED MSR in element 808. When the MED exceeds the normal MED, decision operation 806 is routed to decision operation 810. Decision operation 810 determines whether the MED is equal to or less than an elevated MED (e.g., 40 seconds). When the MED is equal to or less than the elevated MED, decision operation 810 branches to element 812 (continued in FIG. 13). When the MED is greater than the elevated value, decision operation 810 branches to element 814 (continued in FIG. 9).

Figure 9:
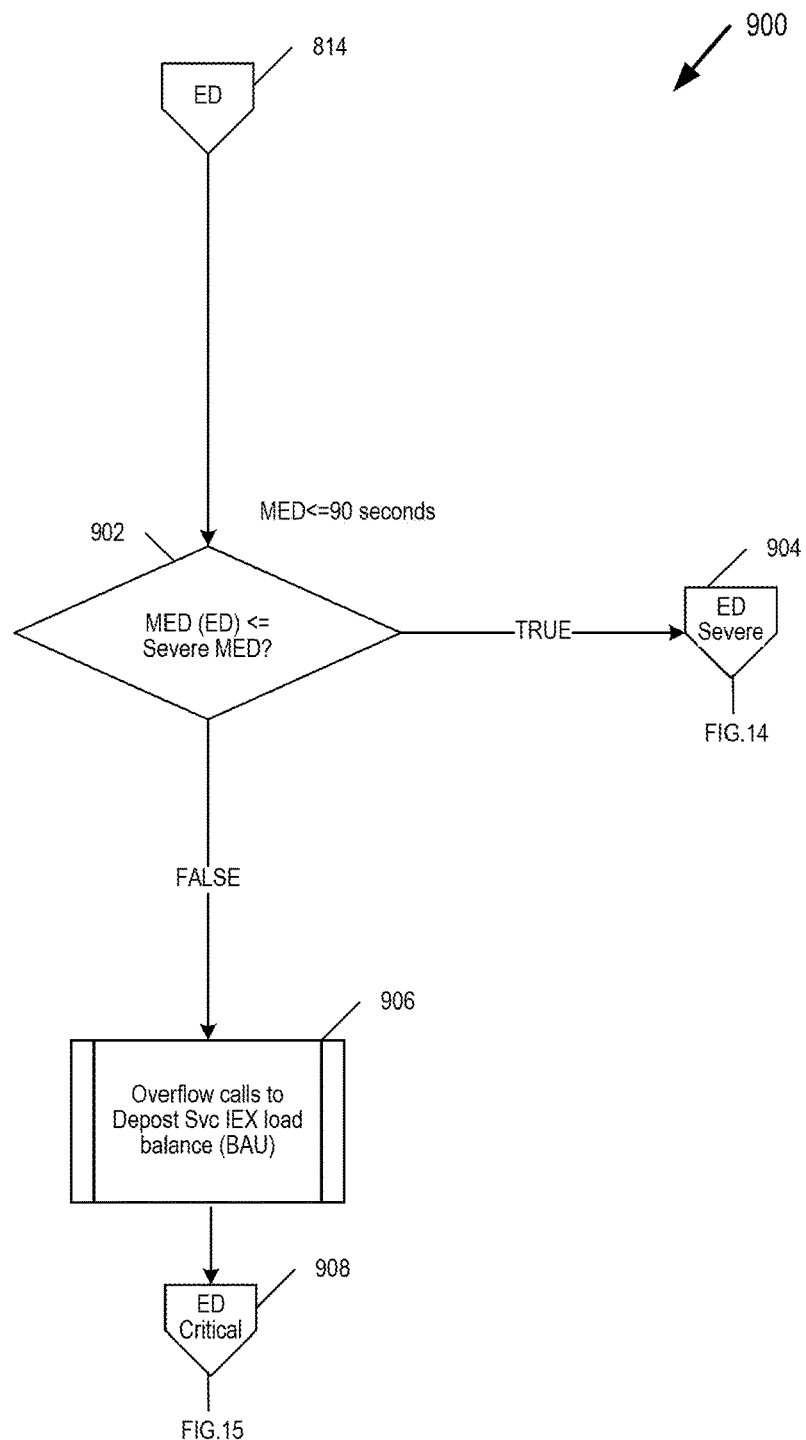
FIG. 9 is a flowchart illustrating a set of operations for routing a call in accordance with various embodiments of the disclosure.

FIG. 9 is a flowchart illustrating a set of operations 900 for routing an ED call. Continuing from element 814 in FIG. 8, decision operation 902 determines whether the MED is less than or equal to a severe MED (e.g., 90 seconds). If the MED is less than or equal to the severe MED, decision operation 902 branches to element 904 (continued in FIG. 14). If the MED is not less than or equal to the severe value, decision operation 902 branches to operation 906 which routes overflow calls to be load balanced because the MED is critical, in element 908 (continued in FIG. 15).

Figure 10:
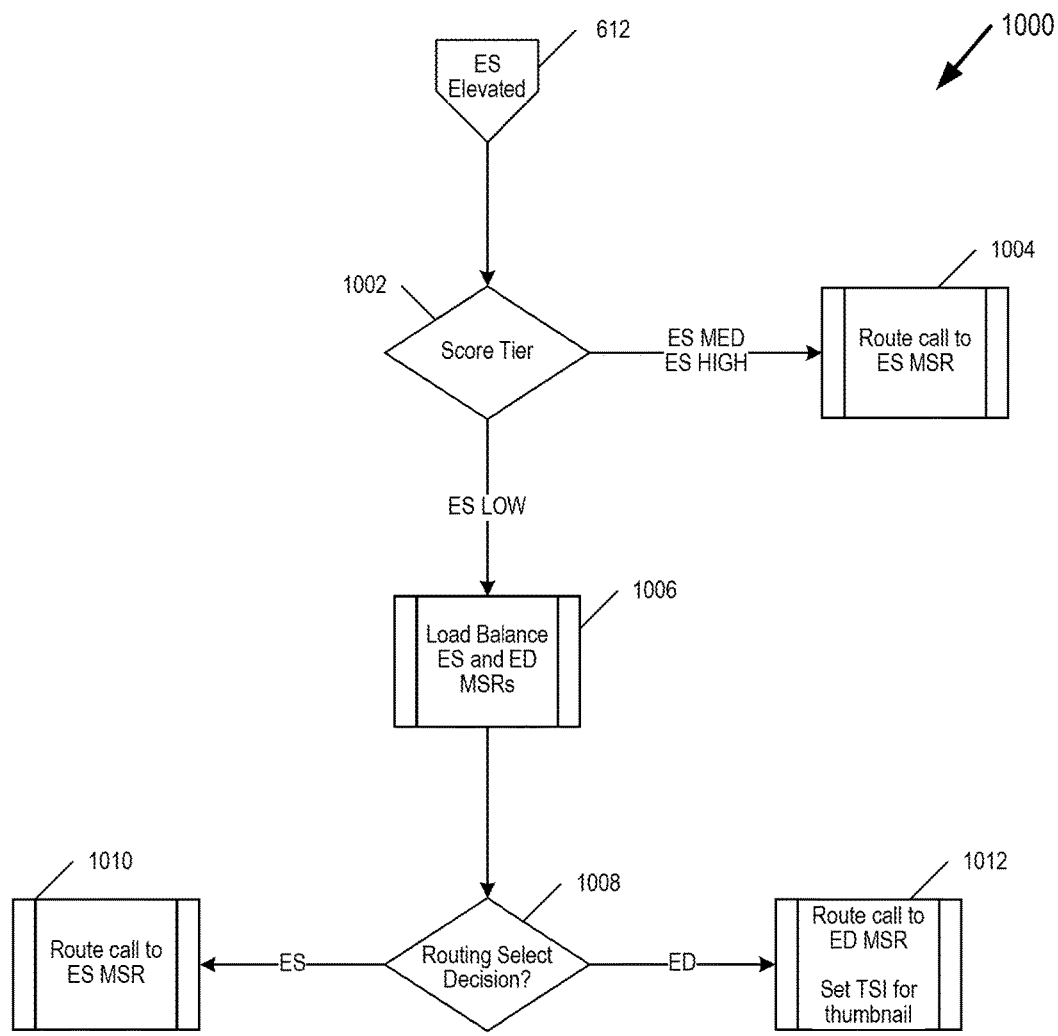
FIG. 10 is a flowchart illustrating a set of operations for routing a call in accordance with various embodiments of the disclosure.

FIG. 10 is a flowchart illustrating a set of operations 1000 for routing an ES call that has an elevated MED. Continuing from element 612, decision operation 1002 determines the priority (i.e., score tier) the call has been assigned. When the priority of the call is high or medium, decision operation 1002 branches to routing operation 1004, which routes the call to an ES. When the priority of the call is low, decision operation 1002 branches to operation 1006 where the call is load balanced between the ES and the ED MSRs. Decision operation 1008 determines which route operation 1006 selected. When decision operation 1008 determines that the call should be sent to an ES MSR, decision operation 1008 branches to operation 1010 where the call is routed to an ES MSR. When decision operation 1008 determines that the call should be sent to an ED MSR, decision operation 1008 branches to operation 1012 where the call is routed to an ED MSR. In some embodiments, a variable such as a can be set to allow an indicator indicating the categorization of the call, call intent or other information to be displayed on the MSR's screen. This may be particularly helpful when a call is being answered by an MSR not as intended but due to load balancing. For example, if an ED MSR receives the ES elevated call as in operation 1012, then the ED MSR may be presented with a thumbnail or other indication of the type of call.

Figure 11:
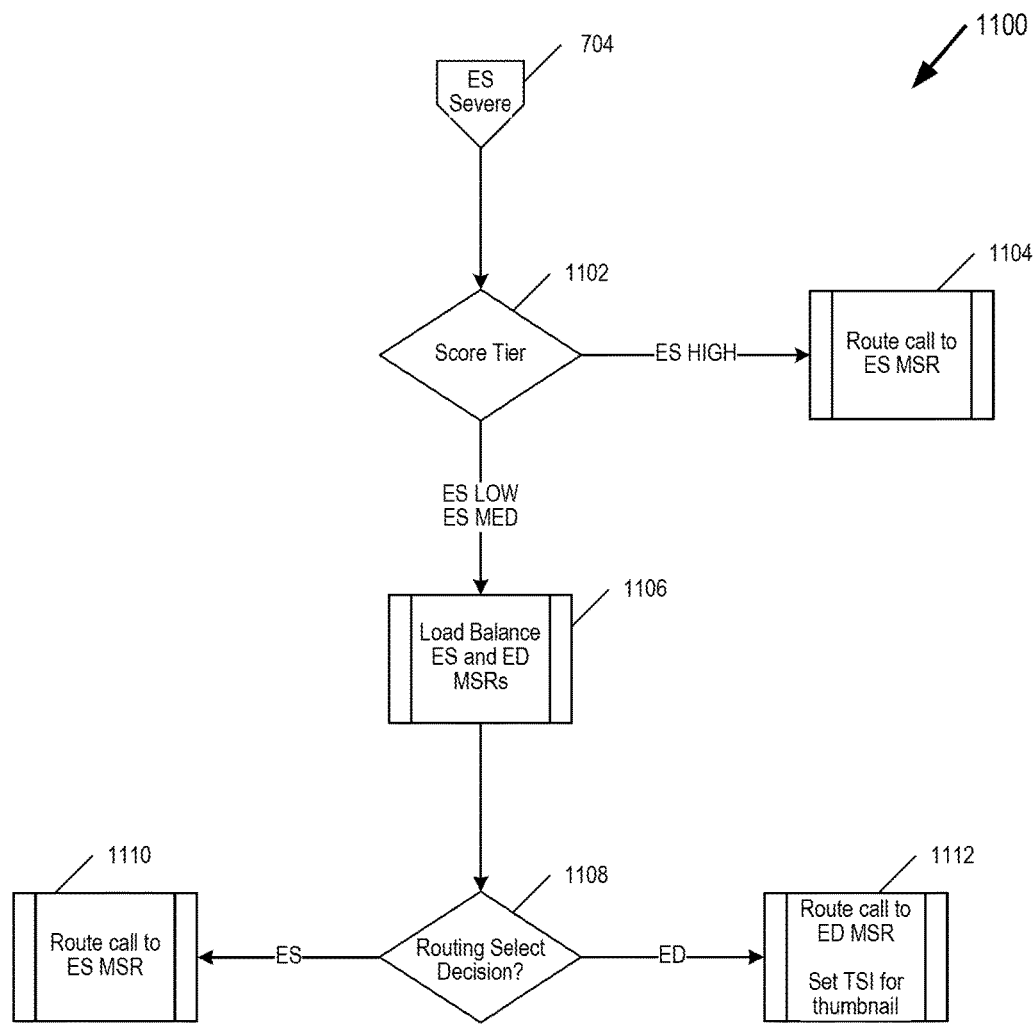
FIG. 11 is a flowchart illustrating a set of operations for routing a call in accordance with various embodiments of the disclosure.

FIG. 11 is a flowchart illustrating a set of operations 1100 for routing an ES call when the MED is severe. Continuing from element 704, decision operation 1102 determines a priority (i.e., score tier) of the call. When the priority of the ES call is high, decision operation 1102 branches to routing operation 1104 in which the call is routed to an ES MSR. When the priority of the call is ES low or ES medium, decision operation 1102 branches to operation 1106 where the call is load balanced between the ES and ED MSRs. Decision operation 1108 determines which route operation 1106 selected. When decision operation 1108 determines that the call should be sent to an ES MSR, decision operation 1108 branches to operation 1110 where the call is routed to an ES MSR. When decision operation 1108 determines that the call should be sent to an ED MSR, decision operation 1108 branches to operation 1112 where the call is routed to an ED MSR. In some embodiments, a variable can be set to allow an indicator indicating the categorization of the call, call intent or other information to be displayed on the MSR's screen. This may be helpful where the call would typically not be answered by an ED MSR, alerting the ED MSR to the type of call.

Figure 12:
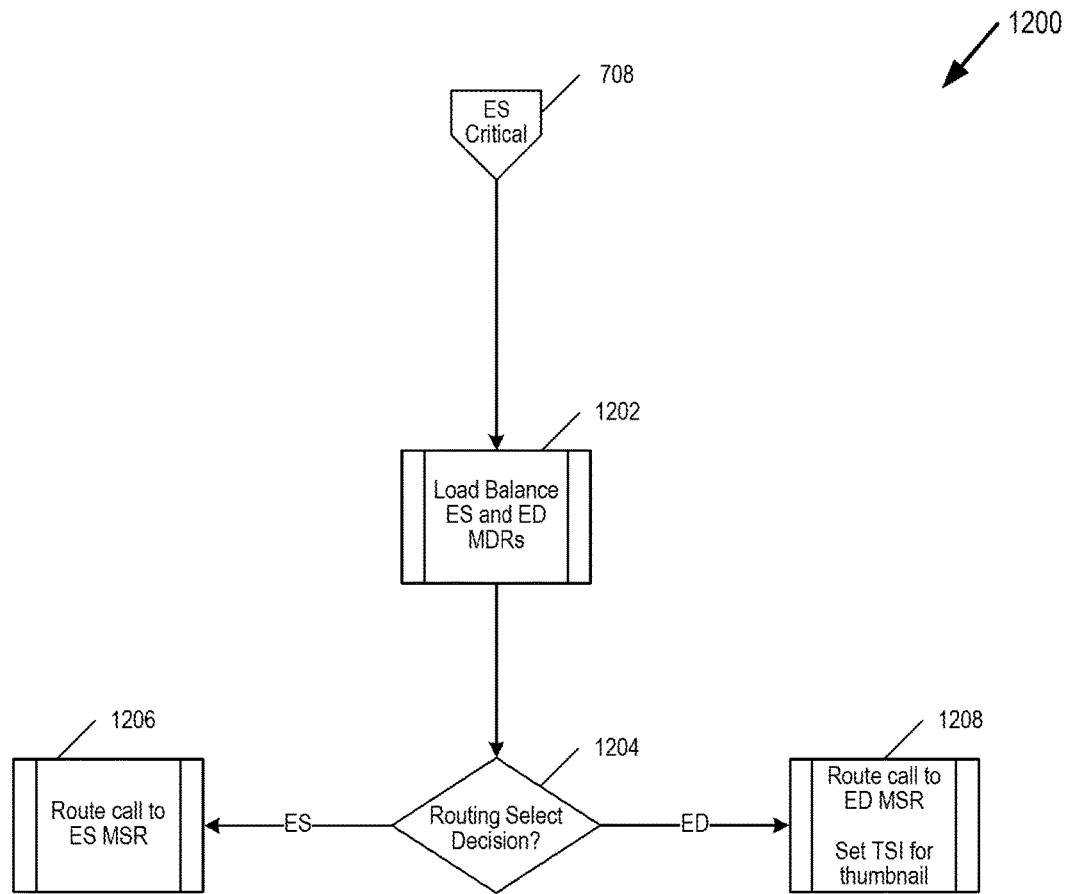
FIG. 12 is a flowchart illustrating a set of operations for routing a call in accordance with various embodiments of the disclosure.

FIG. 12 is a flowchart illustrating a set of operations 1200 for routing a call. Continuing from element 708, operation 1202 load balances all the ES calls with the ED calls. Decision operation 1204 determines which route operation 1202 selected. When decision operation 1204 determines that the call should be sent to an ES MSR, decision operation 1204 branches to operation 1206 where the call is routed to an ES MSR. When decision operation 1204 determines that the call should be sent to an ED MSR, decision operation 1204 branches to operation 1208 where the call is routed to an ED MSR. In some embodiments, a variable can be set to allow an indicator indicating the categorization of the call, call intent or other information to be displayed on the MSR's screen to advise the ED MSR of the type of call.

Figure 13:
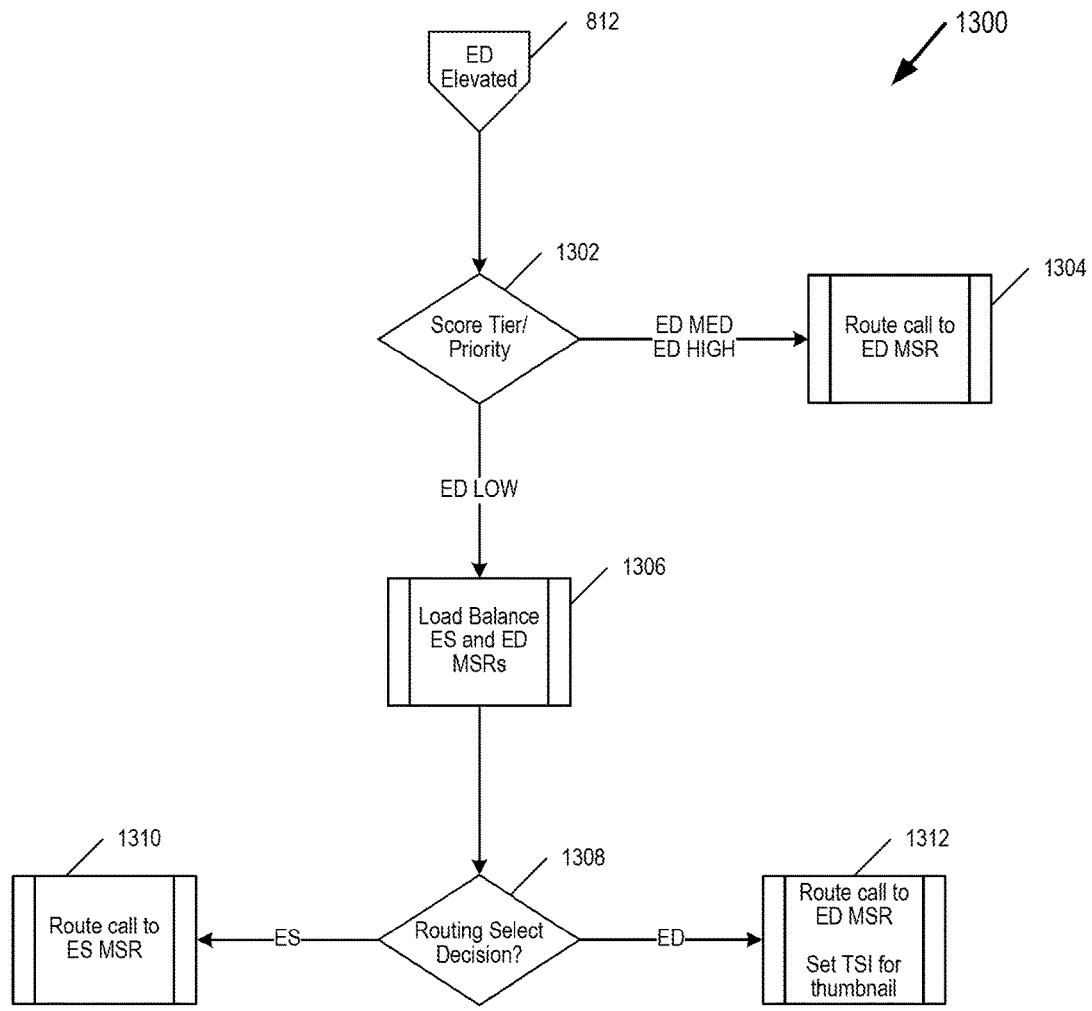
FIG. 13 is a flowchart illustrating a set of operations for routing a call in accordance with various embodiments of the disclosure.

FIG. 13 is a flowchart illustrating a set of operations 1300 for routing a call. Continuing from element 812, decision operation 1302 determines the priority (i.e., score tier) the call has been prioritized into. When the priority of the call is ED high or ED medium, decision operation 1302 branches to routing operation 1304, which routes the call to an ED MSR. When the priority of the call is ED low, decision operation 1302 branches to operation 1306 where the call is load balanced between the ES and the ED MSRs. Decision operation 1308 determines which route operation 1306 selected. When decision operation 1308 determines that the call should be sent to an ES MSR, decision operation 1308 branches to operation 1310 where the call is routed to an ES MSR. When decision operation 1308 determines that the call should be sent to an ED MSR, decision operation 1308 branches to operation 1312 where the call is routed to an ED MSR. In some embodiments, a variable can be set to allow an indicator indicating the categorization of the call, call intent or other information to be displayed on the MSR's screen to advise the ED MSR of the type of call. However, the variable may not be displayed when the call is delivered to an ED MSR as intended, such as in operation 1312.

Figure 14:
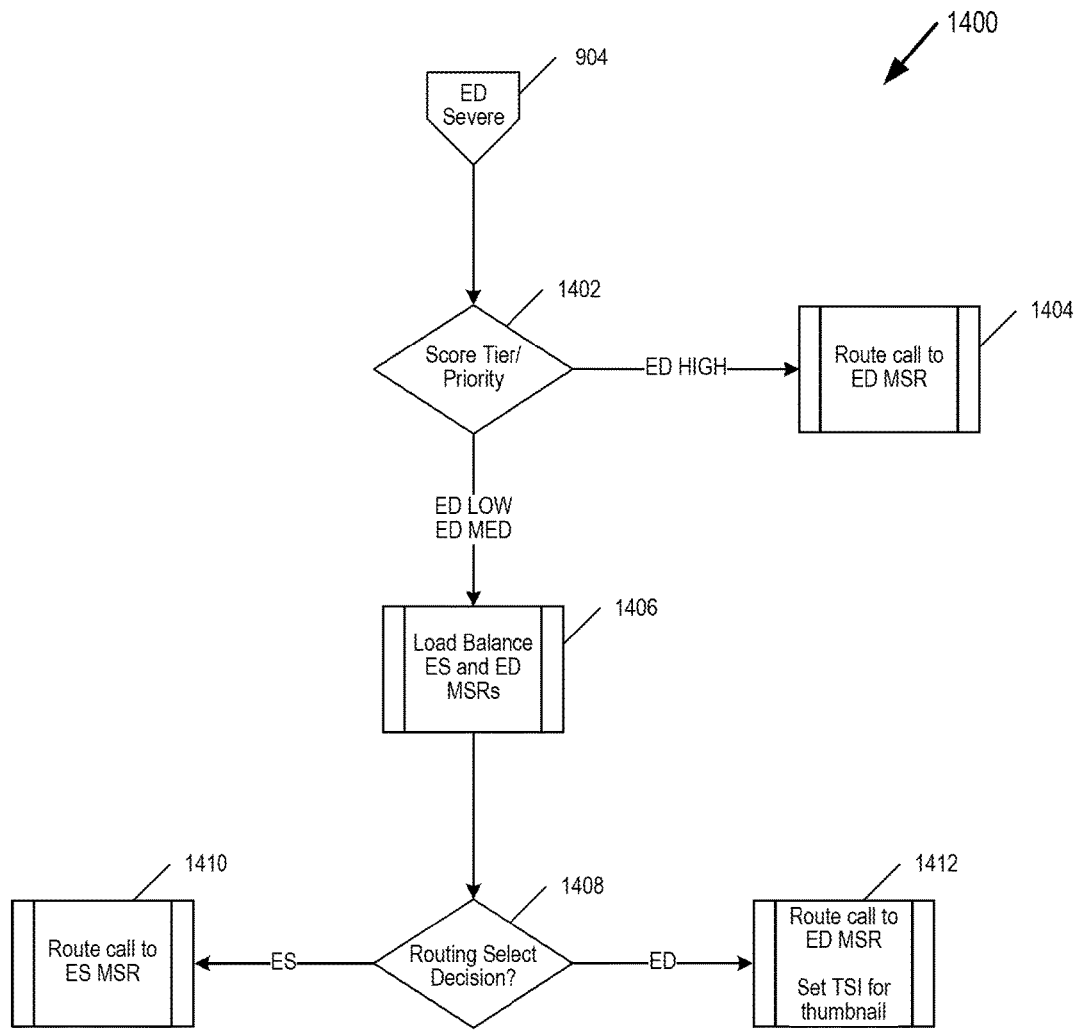
FIG. 14 is a flowchart illustrating a set of operations for routing a call in accordance with various embodiments of the disclosure.

FIG. 14 is a flowchart illustrating a set of operations 1400 for routing a call. Continuing from element 904, decision operation 1402 determines a priority (i.e., score tier) of the call When the priority of the call is ED high, decision operation 1402 branches to routing operation 1404 in which the call is routed to an ED MSR. When the priority of the call is ED low or ED medium, decision operation 1402 branches to operation 1406 where the call is load balanced between the ES and ED MSRs. Decision operation 1408 determines which route operation 1406 selected. When decision operation 1408 determines that the call should be sent to an ES MSR, decision operation 1408 branches to operation 1410 where the call is routed to an ES MSR. When decision operation 1408 determines that the call should be sent to an ED MSR, decision operation 1408 branches to operation 1412 where the call is routed to an ED MSR. In some embodiments, a variable can be set to allow an indicator indicating the categorization of the call, call intent or other information to be displayed on the MSR's screen to advise the ED MSR of the type of call. However, the variable may not be displayed when the call is delivered to an ED MSR as intended, such as in operation 1412.

Figure 15:
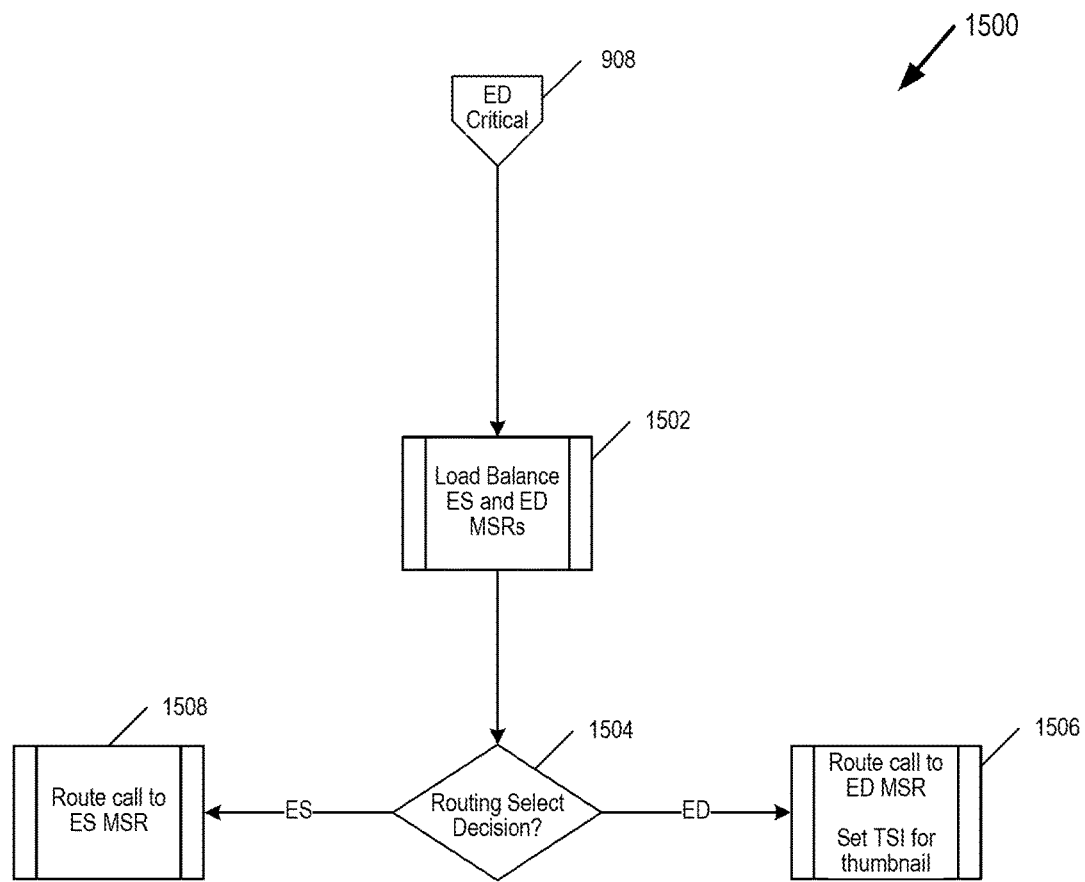
FIG. 15 is a flowchart illustrating a set of operations for routing a call in accordance with various embodiments of the disclosure.

FIG. 15 is a flowchart illustrating a set of operations 1500 for routing a call. Continuing from element 908, operation 1502 load balances all the ED calls with the ES calls, and all calls will receive ES treatment, regardless of their classification type. Decision operation 1504 determines which route operation 1502 selected. When decision operation 1504 determines that the call should be sent to an ES MSR, decision operation 1504 branches to operation 1508 where the call is routed to an ES MSR. When decision operation 1504 determines that the call should be sent to an ED MSR, decision operation 1504 branches to operation 1506 where the call is routed to an ED MSR. In some embodiments, a variable can be set to allow an indicator indicating the categorization of the call, call intent or other information to be displayed on the MSR's screen to advise the ED MSR of the type of call. However, the variable may not be displayed when the call is delivered to an ED MSR as intended, such as in operation 1506.

Figure 16:
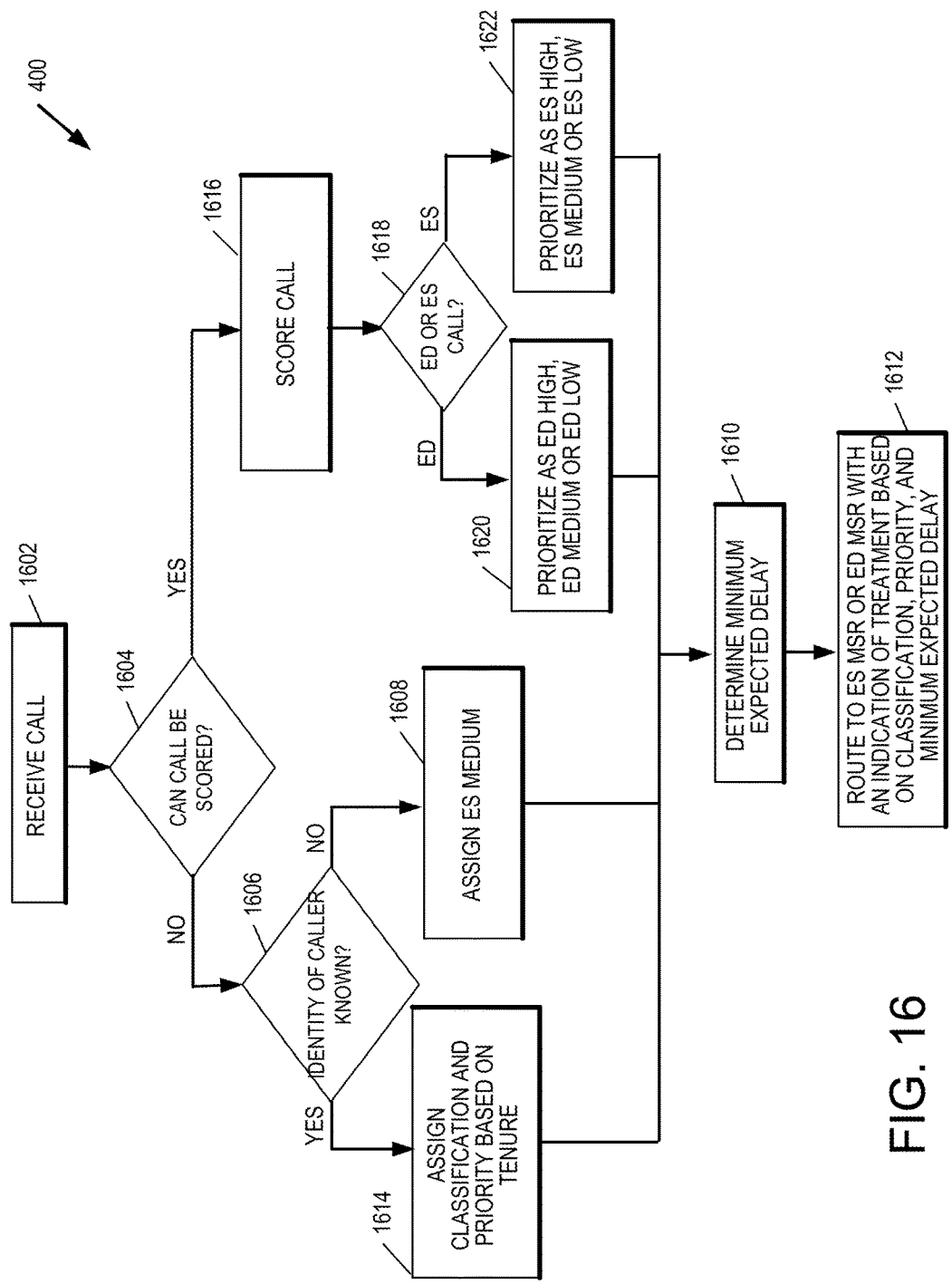
FIG. 16 is a flowchart illustrating a set of operations for routing a call in accordance with various embodiments of the disclosure.

FIG. 16 is a flowchart illustrating a set of operations for routing a call. Receiving operation 1602 receives a call from a caller. Decision operation 1604 determines whether the call can be scored. When the call cannot be scored, decision operation 1604 branches to decision operation 1606. Decision operation 1606 determines whether the identity of the caller is known. When the identity of the caller is not known, classifying/prioritizing operation 1608 classifies the call as an ES call and prioritizes the call as a medium priority. Thereafter, the minimum expected delay of answering the call is determined in MED operation 1610. In routing operation 1612, the call is routed to an ES MSR or an ED MSR based on the classification, priority, and minimum expected delay. The MSR who receives the call is also provided an indication of the treatment (e.g., displayed on a user interface) that the call should receive based on the classification, priority, and minimum expected delay. In some embodiments, the MSR is provided a different set of questions based on the classification and minimum expected delay.

Returning to decision operation 1606, when the identity of the caller is known, decision operation 1606 branches to classifying/prioritizing operation 1614 where the call is classified and prioritized based on a tenure of the customer (i.e., how long the caller has been a customer or member of the organization). Thereafter, the minimum expected delay is determined in MED operation 1610, and a final routing decision is made in routing operation 1612, as described above.

Returning to decision operation 1604, when the call can be scored, the call is scored in scoring operation 1616. Decision operation 1618 determines whether the call should be classified as an ES call or an ED call based on the score. When the call is classified as an ED call, prioritizing operation 1620 prioritizes the call as a high, low or medium priority ED call. Thereafter, the minimum expected delay is determined in MED operation 1610, and a final routing decision is made in routing operation 1612, as described above. When the call is classified as an ES call, prioritizing operation 1622 prioritizes the call as a high, low, or medium priority ES call. Thereafter, the minimum expected delay is determined in MED operation 1610, and a final routing decision is made in routing operation 1612, as described above.

In some embodiments, information about the member is displayed on the MSR's screen including priori digital history, tenure, familial status, current products, employer, member number, and special offers or discounts. The information displayed on the screen may change with the classification, priority and treatment of the call. For example, if the call is classified as an ES call, the information may be filtered because the MSR will not need to see as much information. Additionally, the classification, priority, and treatment may be conveyed to the MSR (e.g., displayed on the screen) so that the MSR knows how to appropriately handle the call. In some embodiments, the MSR is provided a protocol based on one or more of the classification, priority, and treatment.

Computer System Overview

Figure 17:
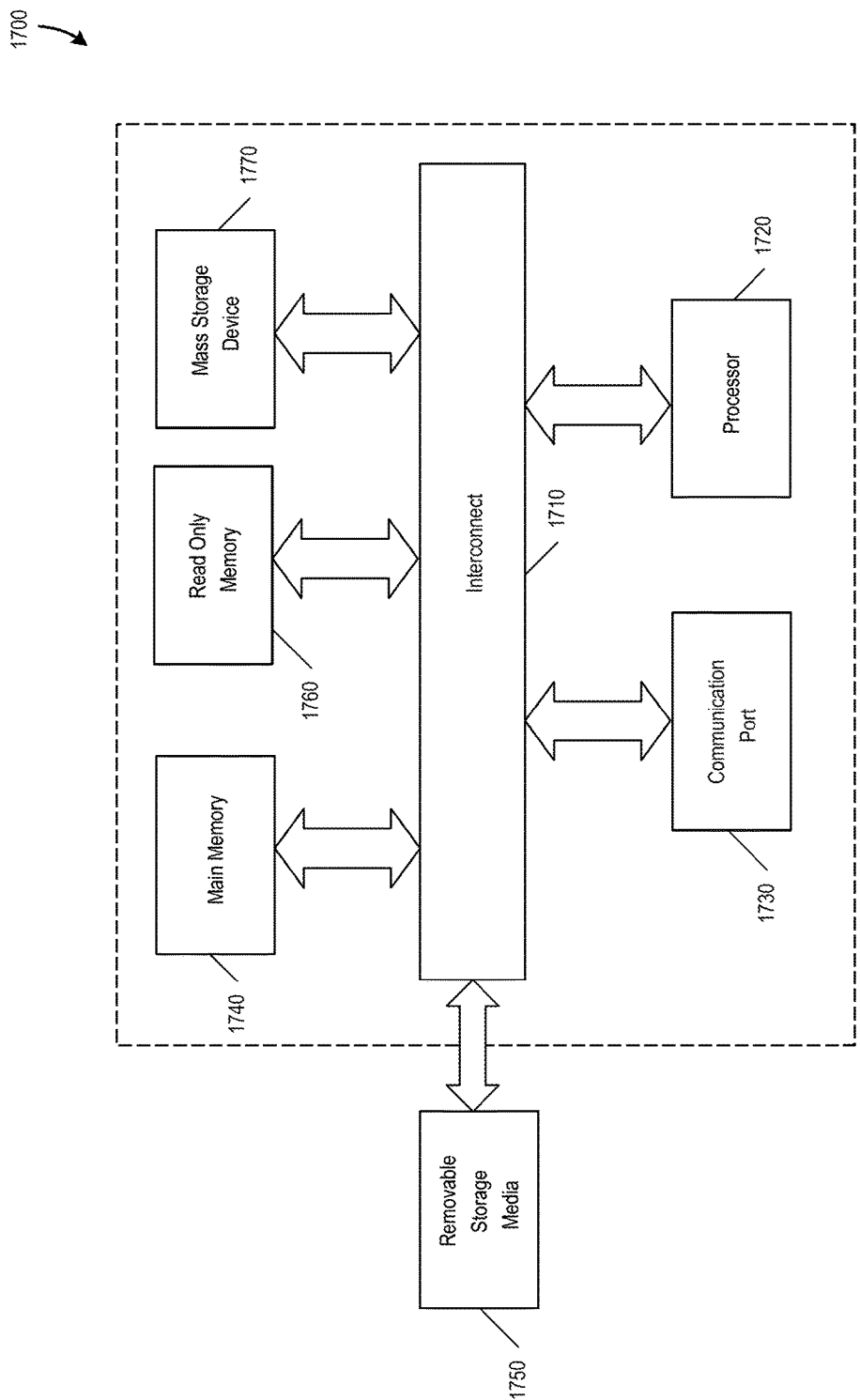
FIG. 17 illustrates an example of a computer system with which some embodiments of the present disclosure may be utilized.

Embodiments of the present disclosure include various steps and operations, which have been described above. A variety of these steps and operations may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 17 is an example of a computer system 1700 with which embodiments of the present disclosure may be utilized. According to the present example, the computer system includes an interconnect 1710, at least one processor 1720, at least one communication port 1730, a main memory 1740, a removable storage media 1750, a read only memory 1760, and a mass storage 1770.

Processor(s) 1720 can be any known processor, such as, but not limited to, an Intel® Itanium® or Itanium 2® processor(s), or AMD® Opteron® or Athlon MP® processor(s), or Motorola® lines of processors. Communication port(s) 1730 can be any of an RS-232 port for use with a modem-based dialup connection, a 10/100 Ethernet port, or a Gigabit port using copper or fiber. Communication port(s) 1730 may be chosen depending on a network such a Local Area Network (LAN), Wide Area Network (WAN), or any network to which the computer system 1700 connects.

Main memory 1740 can be Random Access Memory (RAM), or any other dynamic storage device(s) commonly known in the art. Read only memory 1760 can be any static storage device(s) such as Programmable Read Only Memory (PROM) chips for storing static information, such as instructions for processor 1720.

Mass storage 1770 can be used to store information and instructions. For example, hard disks such as the Adaptec® family of SCSI drives, an optical disc, an array of disks such as RAID, such as the Adaptec family of RAID drives, or any other mass storage devices may be used.

Interconnect 1710 communicatively couples processor(s) 1720 with the other memory, storage, and communication blocks. Interconnect 1710 can be a PCI/PCI-X- or SCSI-based system bus, depending on the storage devices used.

Removable storage media 1750 can be any kind of external hard-drives, floppy drives, IOMEGA® Zip Drives, Compact Disc-Read Only Memory (CD-ROM), Compact Disc-Re-Writable (CD-RW), Digital Video Disc-Read Only Memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly, or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs), interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for routing a call. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A non-transitory computer-readable storage medium comprising a set of instructions that, when executed by one or more processors, cause a machine to:
receive, via a communications network, a call from a caller made via a device;
determine whether a score indicating a probability that the caller will accept an invitation to speak with a representative regarding a new product or service during the call can be generated; and
when the score can be generated:
generate the score for the call,
compare the score to a threshold,
when the score meets or exceeds the threshold, classify the call as a potential sales call, and
route the call to a representative based at least in part on the classification, a priority level of the call associated with tenure of the caller as a customer of an entity, and a minimum expected delay of answering the call.

2. The non-transitory computer-readable storage medium of claim 1, wherein the set of instructions that, when executed by the one or more processors, cause the machine to determine whether the score indicating the probability that the caller will accept the offer to speak with the representative can be generated includes instructions that, when executed by the one or more processors, further cause the machine to:
determine whether the caller can be identified, and
determine tenure of the caller as a customer of an entity.

3. The non-transitory computer-readable storage medium of claim 1, wherein the set of instructions, when executed by the one or more processors, further cause the machine to prioritize the call as a high priority, a medium priority, or a low priority.

4. The non-transitory computer-readable storage medium of claim 1, wherein the set of instructions, when executed by the one or more processors, further cause the machine to determine whether an identity of the caller is known when the score cannot be generated.

5. The non-transitory computer-readable storage medium of claim 4, wherein the set of instructions, when executed by the one or more processors, further cause the machine to:
classify the call based on tenure of the caller as a customer of an entity when the identity of the caller is known, and
classify the call with a default classification when the identity of the caller is unknown.

6. The non-transitory computer-readable storage medium of claim 5, wherein the set of instructions, when executed by the one or more processors, further cause the machine to:
prioritize the call based on the tenure of the caller as the customer of the entity when the identity of the caller is known, and
prioritize the call with a default priority level when the identity of the caller is unknown.

7. The non-transitory computer-readable storage medium of claim 1, routing the call is further based on a priority level of the call and a minimum expected delay of answering the call.

8. A non-transitory computer-readable storage medium comprising a set of instructions that, when executed by one or more processors, cause a machine to:
receive, via a communications network, a call from a caller made via a device;
determine a classification of a first type of call or a second type of call for the call;
assign a priority level of the call within the classification, wherein the priority level of the call is associated with a probability that the caller will accept an invitation to speak with a representative of an entity regarding a new product or service when a score reflecting the probability can be generated;
determine a minimum expected delay for the call to be answered based on the classification; and
route the call to a first type of representative or a second type of representative based on the minimum expected delay for the call, the classification of the call, and the priority level of the call.

9. The non-transitory computer-readable storage medium of claim 8, wherein the priority level is further based on a tenure of the caller as a customer of the entity.

10. The non-transitory computer-readable storage medium of claim 8, wherein when the score can be generated, the set of instructions, when executed by the one or more processors, cause the machine to:
generate the score for the call;
compare the score to a classification threshold; and
when the score meets or exceeds the classification threshold, classify the call as the second type of call, wherein the second type of call includes an attempt to sell at least one product or service during the call.

11. The non-transitory computer-readable storage medium of claim 8, wherein the first type of call receives a first type of treatment, and wherein the second type of call receives a second type of treatment.

12. The non-transitory computer-readable storage medium of claim 8, wherein the first type of call is a customer service call, and wherein the second type of call is a customer service call and a potential sales call.

13. The non-transitory computer-readable storage medium of claim 11, wherein when the minimum expected delay for the call meets or exceeds a threshold, the call receives the first type of treatment regardless of the classification.

14. The non-transitory computer-readable storage medium of claim 11, wherein:
when the minimum expected delay for the call is less than or equal to a first threshold, the call receives a treatment according to the classification,
when the minimum expected delay for the call is greater than the first threshold but less than or equal to a second threshold, and the priority level of the call is a low priority level, the call receives the first type of treatment regardless of the classification,
when the minimum expected delay for the call is greater than the second threshold but less than or equal to a third threshold, and the priority level of the call is a medium priority level or the low priority level, the call receives the first type of treatment regardless of the classification, and
when the minimum expected delay for the call is greater than the third threshold, the call receives the first type of treatment regardless of the classification.

15. The non-transitory computer-readable storage medium of claim 8, wherein the set of instructions that, when executed by the one or more processors, further cause the machine to display, on a user interface of the first type of representative or the second type of representative, the classification of the call, the priority level of the call, and a treatment the call will receive based on the minimum expected delay for the call.

16. The non-transitory computer-readable storage medium of claim 8, wherein the set of instructions that, when executed by the one or more processors, further cause the machine to:
generate a protocol for the first type of representative or the second type of representative based on a treatment the call will receive; and
display, on a user interface of the first type of representative or the second type of representative, the protocol.

17. A non-transitory computer-readable storage medium comprising a set of instructions that, when executed by one or more processors, cause a machine to:
receive, via a communications network, a contact from a user made via a device;
determine a classification of a first type of contact or a second type of contact for the contact;
determine a minimum expected delay for the contact to be answered based on the classification; and
route the contact to a first type of representative or a second type of representative based on the minimum expected delay for the contact and the classification of the contact, wherein the classification of the contact corresponds to a priority level associated with the user, wherein the priority level is associated with a probability that the caller will accept an invitation to speak with a representative of an entity regarding a new product or service.

18. The non-transitory computer-readable storage medium of claim 17, wherein the set of instructions, when executed by the one or more processors, further cause the machine to: assign the priority level of the contact within based on the classification.

19. The non-transitory computer-readable storage medium of claim 18, wherein routing the contact to the first type of representative or the second type of representative is further based on the priority level of the contact.

20. The non-transitory computer-readable storage medium of claim 17, wherein the first type of contact is a customer service contact and the second type of contact is a potential sales contact, wherein the customer service contact is treated differently than the potential sales contact.

\* \* \* \* \*